(12) United States Patent
Yoon et al.

(10) Patent No.: US 9,770,875 B2
(45) Date of Patent: Sep. 26, 2017

(54) APPARATUS AND METHOD FOR FORMING SERRATION PATTERN

(71) Applicant: NEW OPTICS, LTD., Yangju-si Gyeonggi-do (KR)

(72) Inventors: Jongmoon Yoon, Yangju-si (KR); Minkoo Kim, Yangju-si (KR); Taehong Kim, Incheon (KR); Jihyun Jung, Dongducheon-si (KR)

(73) Assignee: NEW OPTICS, LTD., Yangju-si (KR)

( * ) Notice: Subject to any disclaimer, the term of this patent is extended or adjusted under 35 U.S.C. 154(b) by 434 days.

(21) Appl. No.: 14/460,851

(22) Filed: Aug. 15, 2014

(65) Prior Publication Data

US 2015/0048532 A1 Feb. 19, 2015

(30) Foreign Application Priority Data

Aug. 16, 2013 (KR) .................. 10-2013-0097216

(51) Int. Cl.

| | | |
|---|---|---|
| *B29D 11/00* | (2006.01) | |
| *B29C 59/02* | (2006.01) | |
| *F21V 8/00* | (2006.01) | |
| *B29L 11/00* | (2006.01) | |
| *B29K 105/00* | (2006.01) | |

(52) U.S. Cl.
CPC ...... *B29D 11/00663* (2013.01); *B29C 59/021* (2013.01); *B29C 59/022* (2013.01); *G02B 6/001* (2013.01); *B29K 2105/255* (2013.01); *B29K 2105/256* (2013.01); *B29K 2995/0026* (2013.01); *B29L 2011/0075* (2013.01)

(58) Field of Classification Search
CPC ............... B29C 59/021; B29C 59/022; B29D 11/00663; G02B 6/001
See application file for complete search history.

(56) References Cited

U.S. PATENT DOCUMENTS 2,305,945 A * 12/1942 Williams ........... B29D 11/0074
264/2.4
2010/0110725 A1* 5/2010 Chang .................. G02B 6/0036
362/608

FOREIGN PATENT DOCUMENTS

| JP | 2003-62845 A | 3/2003 |
|---|---|---|
| JP | 2004-82437 A | 3/2004 |
| JP | 2006-44120 A | 2/2006 |
| KR | 10-2006-0070439 A | 6/2006 |
| KR | 10-2012-0067777 A | 6/2012 |

\* cited by examiner

*Primary Examiner* — Mathieu Vargot
(74) *Attorney, Agent, or Firm* — Birch, Stewart, Kolasch & Birch, LLP

(57) ABSTRACT

An apparatus for forming a serration pattern on a light guide plate having a top surface emitting a light, a bottom surface opposite to the top surface, and at least one side surface, arranged between the top surface and the bottom surface, as an incident surface. The apparatus includes a base plate supporting the bottom surface of the light guide plate; a fixing plate facing the top surface of the light guide plate with a predetermined interval; and a serration core transferring the serration pattern onto the at least one side surface of the light guide plate by a thermal pressing process causing a thickness deformation of the light guide plate. Further, the fixing plate induces a changed thickness of the light guide plate to be uniform by limiting a thickness change amount of the light guide plate to the predetermined interval.

8 Claims, 21 Drawing Sheets

| | LEFT | MID | RIGHT |
|---|---|---|---|
| Thickness change amount | 67 | 20 | 89 |

| | LEFT | MID | RIGHT |
|---|---|---|---|
| Thickness change amount | 38 | 24 | 42 |

FIG. 25

| Lowering position | Thickness change (um) | | |
|---|---|---|---|
| | LEFT | MID | RIGHT |
| Plate ~ +0.5 | 41 | 29 | 33 |
| LGP | 41 | 18 | 45 |
| LGP + 0.1 | 42 | 19 | 34 |
| LGP + 0.2 | 38 | 24 | 42 |
| LGP + 0.3 | 45 | 22 | 30 |

APPARATUS AND METHOD FOR FORMING SERRATION PATTERN

CROSS-REFERENCE TO RELATED APPLICATIONS

This application claims priority to and the benefit of Korean Patent Application No. 10-2013-0097216 filed in the Korean Intellectual Property Office on Aug. 16, 2013, the entire contents of which are incorporated herein by reference.

TECHNICAL FIELD

The present invention relates to an apparatus and a method for forming a serration pattern and more particularly, to an apparatus and a method which form a serration pattern on a incident side of an optical sheet such as a light guide plate.

BACKGROUND ART

In recent years, rapid progress of an LCD (liquid crystal display) is remarkable in a field of an FPD (flat panel display). The liquid crystal display has been in the spotlight as a core element of not only in a field of a small and medium size display which has been typically used, but also in fields of a small mobile display, a large size television, and an outdoor screen.

However, unlike a self-emitting display such as a CRT (cathode ray tube), a PDP (plasma display panel), and an LED (light emitting diode) display, the liquid crystal display is a non-self emitting display or a non-emissive display which does not emit light by itself so that the liquid crystal display does not spontaneously emit light. Therefore, the liquid crystal display requires a separate light source in order to output an image.

A BLU (back light unit) is a type of a light source device which supplies light to a rear side of a screen of a liquid crystal display. The BLU is a core component which not only directly affects an image quality such as brightness of an image, a color reproduction degree, a viewing angle, a contrast ratio, or readability, power consumption, or a lifespan of a product, but also accounts for approximately 20 to 50% of an entire unit price of the liquid crystal display.

The back light unit is mainly classified into a direct-lit and an edge-lit depending on an arrangement pattern of a light source. In the direct-lit back light unit, a light source is disposed immediately at a rear side of a screen to emit light toward a liquid crystal panel but in the edge-lit back light unit, a light source is disposed at a periphery of the screen to emit light to the side and a light guide plate guides the light to be irradiated toward the liquid crystal panel. When the direct-lit back light unit and the edge-lit back light unit are compared, generally, the edge-lit back light unit is advantageous in terms of a thickness or a cost of the product but the direct-lit back light unit is advantageous in terms of brightness, a contrast ratio, uniformity of a screen, and image reproducibility.

As described above, the edge-lit back light unit is excellent in terms of a thickness of the product but an image quality of the edge-lit back light unit is lower than the direct-lit back light unit. The image quality of the edge-lit back light unit mainly depends on a light guide plate which supplies light, which is incident from the light source to the side, to a liquid crystal display panel in the form of a surface light source. Specifically, when the thickness of the light guide plate and the number of light sources are reduced in order to reduce a weight and a thickness of the display device, a dark portion is generated between a point light source and a point light source and an area of a light entrance portion which the light reaches is reduced so that light entrance efficiency is lowered. As a result, an amount of light which is supplied to the display panel is reduced so that brightness is lowered. Therefore, a light guide plate through which brightness is less lowered and light output is uniformly distributed is strongly demanded.

SUMMARY OF THE INVENTION

The present invention has been made in an effort to provide an apparatus and a method for forming a serration pattern which form a serration at a side of a light guide plate, in order to improve light entrance efficiency of a light source with respect to a light guide plate in an edge-lit back light unit.

The present invention has been made in an effort to further provide an apparatus and a method for forming a serration pattern which form serration patterns with different depths in upper/lower portions and a center portion of a side of a light guide plate in order to uniformly control light entrance efficiency of the upper/lower portions and the center portion of the side of the light guide plate when the light is irradiated onto the light guide plate using a point light source.

The present invention has been made in an effort to further provide an apparatus and a method for forming a serration pattern which prevent a shape of a side of a light guide plate from being deformed while forming a serration at the side of the light guide plate and maintains the thickness of the light guide plate to be constant. However, the problems to be solved by the present invention are not limited to the above-described problems and problems which have not been mentioned may be clearly understood from the specification and the accompanying drawings by those skilled in the art.

An exemplary embodiment of the present invention provides a serration pattern forming apparatus, including: a base plate on which a light guide plate is mounted; a serration core which transfers a serration pattern onto a side of the light guide plate; and a fixing plate which is opposite to a top surface of the light guide plate and fixed to be spaced apart from the top surface of the light guide plate with a predetermined interval in order to induce a changed amount of thickness of the light guide plate caused by transferring the serration pattern to be uniform.

However, the solving means of the problems of the present invention are not limited to the above-described solving means and solving means which have not been mentioned may be clearly understood from the specification and the accompanying drawings by those skilled in the art.

According to the present invention, a serration pattern is formed at a side of a light guide plate in an edge-lit back light unit so that light entrance efficiency from a light source which is disposed at the side of the light guide plate may be improved.

According to the present invention, serrations having different pattern depths are formed in upper/lower portions and a center portion of a side of the light guide plate so that uniform light is supplied to a display panel.

According to the present invention, when a serration pattern is formed at a side of a light guide plate, a shape of the side of the light guide plate may be prevented from being deformed and the thickness of the light guide plate may be maintained to be uniform.

The effects of the present invention is not limited to the above-described effects and still other effects which have not been mentioned will be apparently understood to those skilled in the art to which the present invention pertains from the description and the accompanying drawings.

BRIEF DESCRIPTION OF THE DRAWINGS

FIG. 25 is a table showing an amount of changed thickness of a light guide plate per height of a guide block according to still another exemplary embodiment of the present invention.

DETAILED DESCRIPTION

Figure 1:
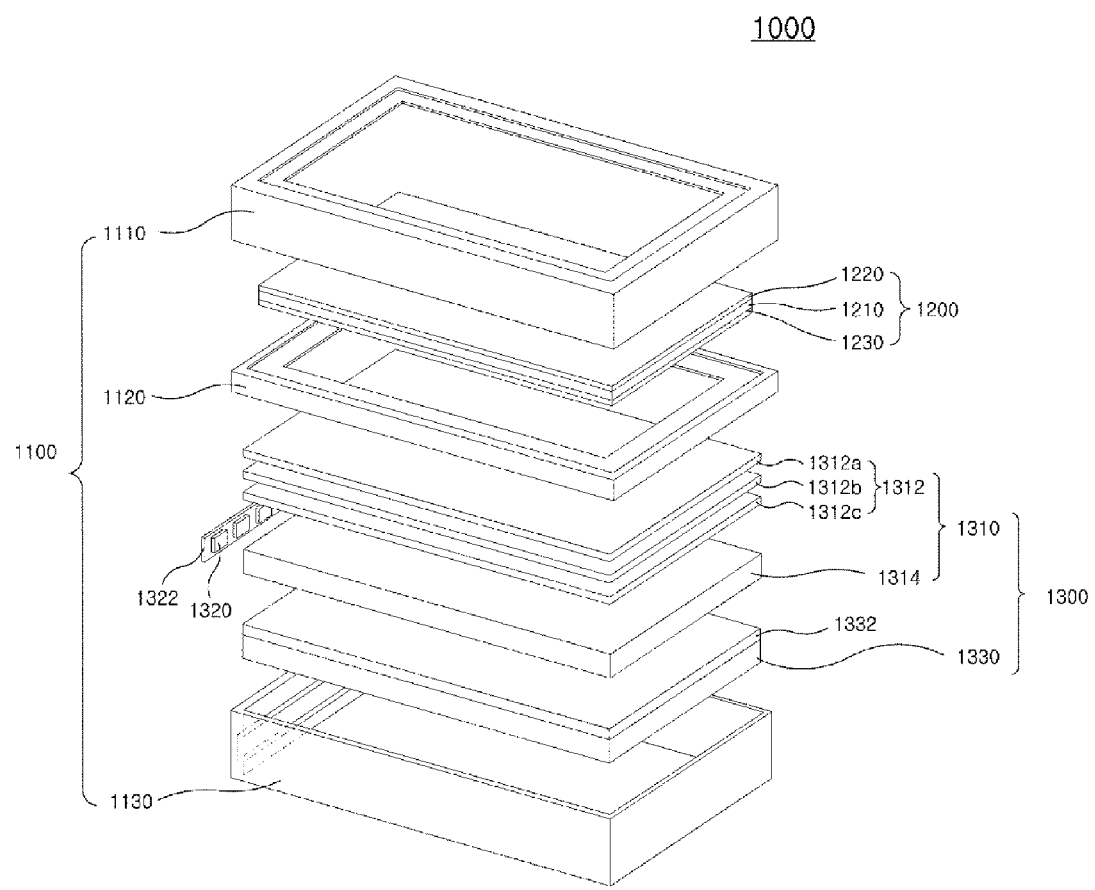
FIG. 1 is an exploded perspective view of a liquid crystal display device according to an exemplary embodiment of the present invention.

The exemplary embodiments described in the specification are to clearly describe a spirit of the present invention to those skilled in the art so that it should be interpreted that the present invention is not limited to the exemplary embodiments described in the specification and the scope of the present invention covers a changed embodiment or a modification embodiment without departing from the spirit of the present invention.

A general terminology which is currently widely used while considering a function in the present invention is selected as the terminology used in this specification and may depend on the intention of those skilled in the art, or the custom or new technology. However, when a specific terminology is defined to have an arbitrary meaning, the meaning of the terminology may be separately described. Therefore, the terminology used in the specification is analyzed based on a substantial meaning of the terminology and the specification rather than a simple title of the terminology.

The accompanying drawings of the specification are provided so as to easily describe the present invention and shapes illustrated in the drawing may be exaggerated so as to help the understanding of the present invention if necessary so that the present invention is not limited to the drawings.

A detailed explanation of known related functions and constitutions may be omitted if necessary when it is determined that the detailed explanation obscures the subject matter of the present invention.

Hereinafter, a liquid crystal display device 1000 according to an exemplary embodiment of the present invention will be described.

Figure 2:
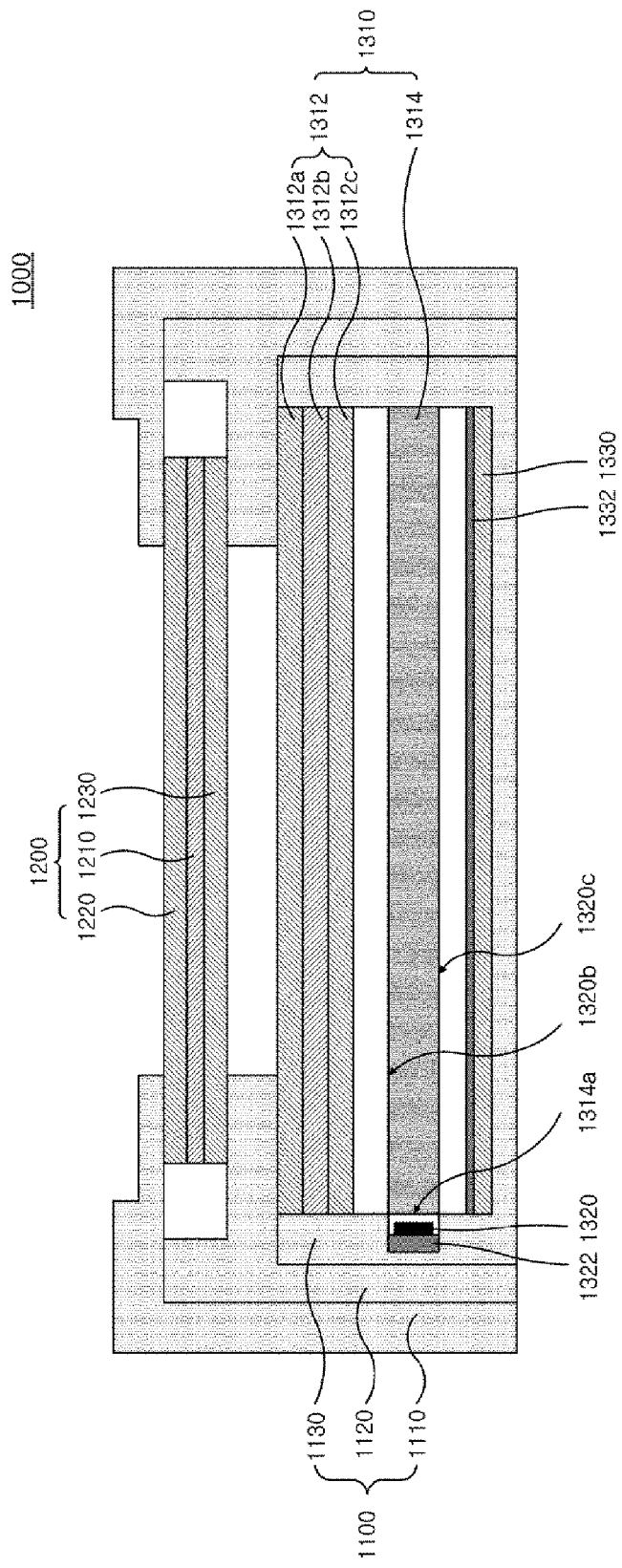
FIG. 2 is a cross-sectional view of the liquid crystal display device according to the exemplary embodiment of the present invention.

FIG. 1 is an exploded perspective view of a liquid crystal display device 1000 according to an exemplary embodiment of the present invention and FIG. 2 is a cross-sectional view of the liquid crystal display device 1000 according to the exemplary embodiment of the present invention.

Referring to FIGS. 1 and 2, the liquid crystal display device 1000 may include a housing 1100, a display panel 1200, and a back light unit 1300.

The housing 1100 accommodates the display panel 1200 and the back light unit 1300 therein to protect the display panel 1200 and the back light unit 1300 from an external impact. Further, the housing 1100 has a function which aligns the display panel 1200 and the back light unit 1300.

The housing 1100 may include a top case 1110, a guide frame 1120, and a bottom case 1130. The top case 1110 and the bottom case 1130 are coupled to each other so as to cover a front surface and a rear surface of the liquid crystal display device 1000 and the guide frame 1120 is mounted therebetween.

Here, the display panel 1200 is inserted between the top case 1110 and the guide frame 1120 to be fixed and the back light unit 1300 is inserted between the bottom case 1130 and the guide frame 1120 to be fixed. In this case, the guide frame 1120 aligns the display panel 1200 and the back light unit 1300.

The display panel 1200 uses light which is emitted from the back light unit 1300 to display an image.

The display panel 1200 may include two transparent substrates 1220 and 1230 and a liquid crystal layer 1210 which is interposed between the substrates 1220 and 1230. Here, the transparent substrates 1220 and 1230 may be a color filter 1220 and a TFT (thin film transistor) 1230, respectively.

An orientation of the liquid crystal layer 1210 varies depending on an electrical signal, thereby performing a function which selectively transmits light emitted from the back light unit 1300 to display an image in the unit of a pixel.

The thin film transistor 1230 supplies an electrical signal to the liquid crystal layer 1210 to adjust whether light transmits the liquid crystal layer 1210. Specifically, in the thin film transistor 1230, a plurality of gate lines and a plurality of data lines which intersects the plurality of gate lines may be formed and thus the thin film transistor may be formed at intersections of the gate line and the data line. Here, each of the thin film transistors corresponds to a pixel of the liquid crystal display device 1000 and when the transistor is turned on/off, the orientation of the liquid crystal layer 1210 is adjusted to display an image. Examples of the thin film transistor 1230 include a TN (twisted nematic) type, an ISP (in plane switching) type, and a VA (vertical alignment) type and but the thin film transistor 1230 is not limited to the above-mentioned types in the present invention.

The color filter 1220 may color the light which transmits the liquid crystal layer 1210. The color filter 1220 may include color filters having RGB (red, green, and blue) colors corresponding to the pixels, a black matrix which covers the gate line, the data line, and the thin film transistor, and a common electrode which covers the entire substrate.

A panel driving unit (not illustrated) which applies a scan signal to the gate line and a data signal to the data line may be provided at a border of the display panel 1200. The panel driving unit (not illustrated) may be provided as a PCB (printed circuit board) and the panel driving unit (not illustrated) may be electrically connected to the gate line and the data line by a COF (chip on film, not illustrated). However, the panel driving unit (not illustrated) is not necessarily provided as a printed circuit board but a TCP (tape carrier package) may be provided instead of the chip on film (not illustrated).

The back light unit 1300 may output light at a rear side of the display panel 1200 so that the display panel 1200 may output an image.

The back light unit 1300 may include optical sheets 1310, a light source 1320, and a reflective plate 1332.

The optical sheets 1310 are disposed at the rear side of the display panel 1200 so as to be opposite to the display panel 1200. The optical sheets 1310 may be disposed such that at least one optical sheet 1310 is laminated. Desirably, the optical sheets 1310 may be three or five. Here, the optical sheet 1310 may include an LGP (light guide plate), a diffusion sheet, or a prism sheet. According to an exemplary embodiment, the optical sheet 1310 may include a vertical prism sheet 1312*a*, a horizontal prism sheet 1312*b*, a diffusion sheet 1312*c*, and a light guide plate 1314 in this order from the display panel 1200, as illustrated in FIGS. 1 and 2. However, not all the optical sheets 1310 are necessary or necessarily disposed in the above-mentioned order.

The light source 1320 outputs light which is irradiated at the rear side of the display panel 1200. In the case of the edge-lit back light unit 1300, the light source 1320 may be disposed at a side of the light guide plate 1314 so as to be parallel to each other. Specifically, a side substrate 1322 may be disposed so as to be opposite to one side of the light guide plate 1314 and the light source 1320 may be mounted on the side substrate 1322. The light sources 1320 may be disposed on the side substrate 1322 in a line. A CCFL (cold cathode fluorescent lamp), an EEFL (external electrode fluorescent lamp) or an LED (light emitting diode) may be provided as the light source 1320.

The reflective plate 1332 may be disposed such that the reflective plate 1332 is opposite to the display panel 1200 and the optical sheets 1310 are disposed therebetween. According to an exemplary embodiment, the reflective plate 1332 may be formed on a lower substrate 1330 which is attached onto the bottom case 1130, as illustrated in FIGS. 1 and 2. Such a reflective plate 1332 may reflect the light which is emitted to the rear surface of the light guide plate 1314 toward the display panel 1200. Therefore, the light loss is reduced so that overall display brightness may be improved.

Hereinafter, a general function of the above-described back light unit 1300 will be briefly described.

First, the light source 1320 emits the light. When the light source 1320 is the cold cathode fluorescent lamp or the external electrode fluorescent lamp, the light is emitted in the form of a line light source and when the light source 1320 is the light emitting diode, the light is emitted in the form of a point light source.

Next, the light guide plate 1314 changes the light which is in the form of the point light source or the line light source into the form of a surface light source to emit the light toward the display panel 1200. A substrate which is formed of PMMA (Poly Methyl Methacrylate) having an excellent refractive index or a PC (poly carbonate) having an excellent heat resistance may be provided as the light guide plate 1314. Further, a pattern which changes the point light source type into a surface light source type may be provided on a top surface or a bottom surface of the light guide plate 1314. Such a pattern may be formed by a silk screening technique, a laser etching technique, or a deposition technique.

Specifically, the light which is emitted from the light source 1320 is incident onto a light entrance surface 1314*a* at the side of the light guide plate 1314. Here, the light entrance surface 1314*a* is one surface onto which the light is incident among the sides of the light guide plate 1314. When the light is incident onto the light entrance surface 1314*a* of the light guide plate 1314, the light is reflected or diffused from the inside or a surface of the light guide plate 1314 and thus the light is emitted in the form of a surface light source through a light outputting surface 1314*b* of the light guide plate 1314 toward the display panel 1200.

In this case, some of light may be emitted onto a rear surface 1314c of the light guide plate 1314. When the light which is emitted onto the rear surface 1314c of the light guide plate 1314 is reflected by the reflective plate 1332 to be incident onto the rear surface 1314c of the light guide plate 1314 again, similarly, the light is reflected or diffused from the inside or the surface of the light guide plate 1314 to be emitted through the light outputting surface 1314b toward the display panel 1200.

In the meantime, even though FIG. 2 illustrates that the light source 1320 is disposed only at one side of the light guide plate 1314, the light source 1320 may be disposed at two or more sides and thus two or more light entrance surfaces 1314a may be provided on the light guide plate 1314. For example, the edge-lit back light unit 1300 may include a 1H (one horizontal) type in which a light source 1320 array is disposed on one of upper and lower surfaces along a longitudinal direction of the display panel 1200, a 2H (two horizontal) type in which light sources 1320 are disposed on both the upper and lower sides, a 1V (one vertical) type in which the light source 1320 is disposed on one of left and right sides along a width direction of the display panel 1200, and a 2V (two vertical) type in which the light sources 1320 are disposed on both the left and right sides, and the type of the edge-lit back light unit 1300 may be selected by generally considering a size and an area of the display panel 1200, and a unit price and a purpose of the product. Among them, the 2H type or 2V type back light unit 1300 may include two or more light entrance surfaces 1314a.

The light which is emitted in the form of the surface light source through the light outputting surface 1314b of the light guide plate 1314 is incident onto the diffusion sheet 1312c. The diffusion sheet 1312c may diffuse the incident light. The diffusion sheet 1312c may disperse the incident light while the incident light passes through the diffusion sheet 1312c. Therefore, the diffusion sheet 1312c may improve the uniformity of the light output distribution. For example, even though the light which is output to the light outputting surface 1314b of the light guide plate 1314 has a form of a surface light source, a dark/bright pattern such as a moiré phenomenon may occur. The diffusion sheet 1312c may eliminate or reduce the dark/bright pattern.

The prism sheets 1312a and 1312b may adjust the path of the light to be perpendicular to the display panel 1200. The light which passes through the light guide plate 1314 or the diffusion sheet 1312c proceeds while being distributed to all directions. The prism sheets 1312a and 1312b may make the distributed light be emitted in a direction perpendicular to the display panel 1200. Accordingly, the brightness of the liquid crystal display device 1000 may be improved.

In some cases, another diffusion sheet may be disposed on upper portions of the prism sheets 1312a and 1312b. Generally, the light which passes through the prism sheets 1312a and 1312b vertically proceeds so that the viewing angle may be generally narrow. However, if the light may pass through the diffusion sheet again, the viewing angle may be improved.

Hereinafter, the light guide plate 1314 according to an exemplary embodiment of the present invention will be specifically described.

Figure 3:
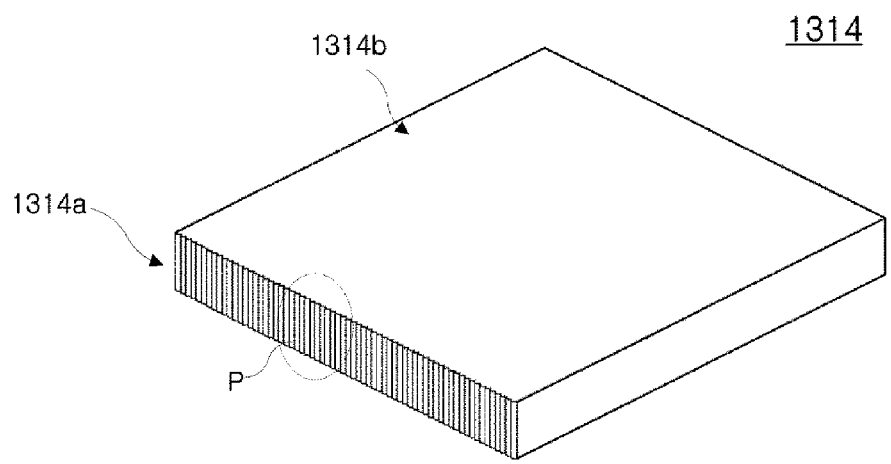
FIG. 3 is a perspective view of a light guide plate according to an exemplary embodiment of the present invention.
Figure 4:
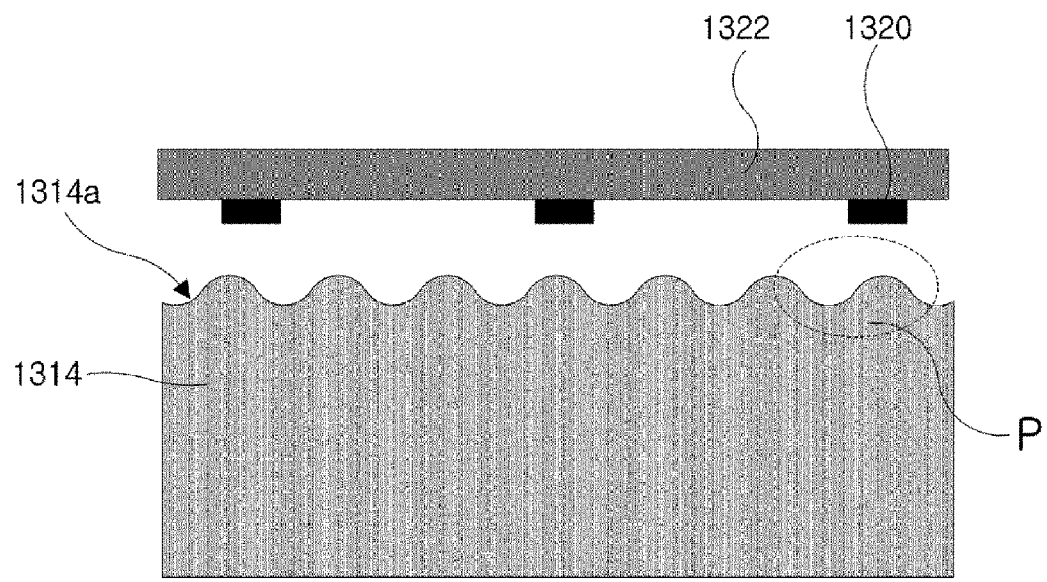
FIG. 4 is a view illustrating a light entrance surface of the light guide plate according to the exemplary embodiment of the present invention.

FIG. 3 is a perspective view of a light guide plate 1314 according to an exemplary embodiment of the present invention and FIG. 4 is a view illustrating a light entrance surface 1314a of the light guide plate 1314 according to the exemplary embodiment of the present invention.

Referring to FIGS. 3 and 4, the light guide plate 1314 may be provided to have a quadrangular flat panel type which includes a light entrance surface 1314a at a side where the light is incident from the light source 1320 and a light outputting surface 1314b which is opposite to the display panel 1200 and emits the light. Even though FIG. 3 illustrates that one side of the light guide plate 1314 is the light entrance surface 1314a, the light entrance surface 1314a may be provided on two or more sides.

A predetermined pattern P may be formed on the light entrance surface 1314a. For example, the pattern may be a serration pattern. The light entrance surface 1314a on which the serration pattern is formed may refract the light which is incident from the light source 1320 to be diffusively incident.

As described above, the light guide plate 1314 may output the light which is output to the side from the light source 1320 in the form of a point light source or a line light source to the display panel 1200 in the form of a surface light source. The surface light source which is output from the light guide plate 1314 needs to have a uniform light output distribution so that the display panel 1200 outputs a high quality image.

When the light is incident onto the light entrance surface 1314a by the pattern which is formed on the light entrance surface 1314a, if the light is refracted and diffused, the light output distribution of the light which is output to the light outputting surface 1314b may be uniformized.

In the meantime, a specific pattern may be formed on the light outputting surface 1314b or a rear surface 1314c of the light guide plate 1314 in order to reflect or diffuse the light and thus the light output distribution may be improved.

Hereinafter, a serration pattern forming apparatus 2000 according to an exemplary embodiment of the present invention will be specifically described.

Figure 5:
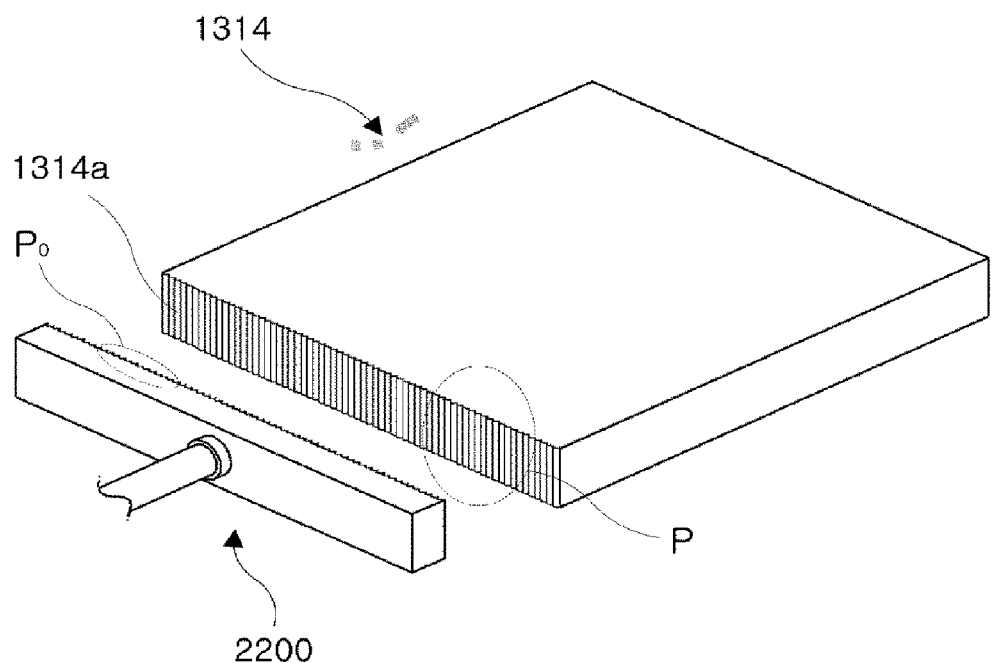
FIG. 5 is a view illustrating a serration core which forms a serration pattern at a side of a light guide plate according to an exemplary embodiment of the present invention.

FIG. 5 is a view illustrating a serration core 2200 which forms a serration pattern at a side 1314a of the light guide plate 1314 according to an exemplary embodiment of the present invention. Here, in the edge-lit back light unit 1300, the light is incident from the light source 1320 to the side 1314a of the light guide plate 1314 so that the side 1314a and the light entrance surface 1314a of the light guide plate 1314 may be the same surface.

Referring to FIG. 5, the serration pattern P may be formed on one or more sides 1314a of the light guide plate 1314 which is formed to be flat in order to effectively diffuse the light which is irradiated from the light source 1320.

The serration pattern P may be transferred onto one or more sides 1314a from an original pattern Po which is included in the serration core 2200 and the serration pattern P may be transferred onto one or more sides 1314a of the light guide plate 1314 depending on the number of serration cores 2200.

The serration pattern P may be transferred onto the light guide plate 1314a by at least one of pressurizing and heating. In this case, only when any one or more conditions of a temperature, a pressure, and a thermal transferring time of the serration core 2200 are satisfied, a desired serration pattern may be formed.

A heat condition is to maintain a temperature of the original pattern Po which is formed on the serration core 2200 to be equal to or higher than a heat distortion temperature and equal to or lower than a glass transition temperature corresponding to a material of the light guide plate 1314a, and for example, it is desirable to maintain a temperature of approximately 70° C. to 140° C. To this end, a heating unit (not illustrated) may be added to the serration core 2200. The heating unit may be mounted as a heater which is supplied with electricity to generate heat.

As a pressure condition, when the original pattern Po which is formed on the serration core 2200 is transferred onto the side 1314*a* of the light guide plate 1314, the side 1314*a* of the light guide plate 1314 is desirably pressurized with a pressure of approximately 0.1 kg/mm$^2$ to 2.0 kg/mm$^2$ and approximately 0.1 to 0.2 tone is desirably applied to the entire side 1314*a*. However, the pressure condition may be changed depending on a material and a total area of the light guide plate 1314.

Figure 6:
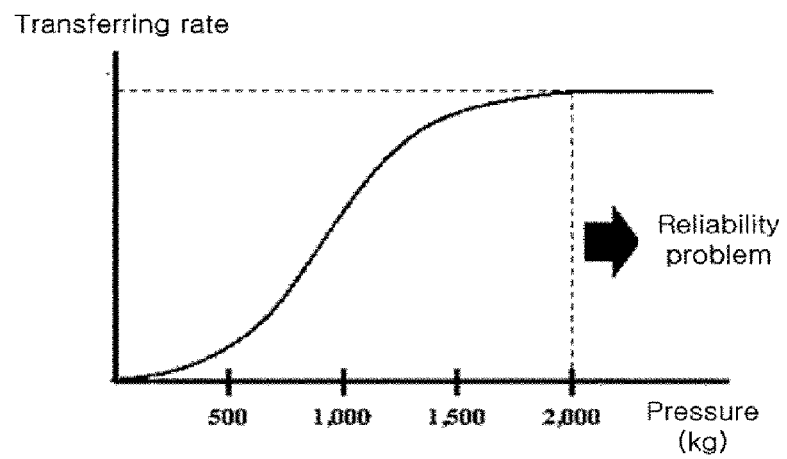
FIG. 6 is a graph illustrating a pressurizing condition when a serration pattern according to an exemplary embodiment of the present invention is formed.

FIG. 6 is a graph illustrating a pressurizing condition when a serration pattern P according to an exemplary embodiment of the present invention is formed.

As illustrated in FIG. 6, the transferring rate of the serration pattern P is increased as the pressure is increased so that the serration pattern P is transferred with a transferring rate of almost 100% when a pressure of approximately 2.0 ton is applied. Accordingly, when the serration pattern P is transferred using a pressure of 2.0 ton or higher, the transferring rate is no longer improved and deformation such as crushed light guide plate 1314 or severe thickness deformation is generated so that the reliability of the serration pattern P deteriorates, thereby lowering the entire reliability of the light outputting distribution of the light guide plate 1314.

A time condition is a thermal transferring time of the serration core 2200 when the heat condition and the pressure condition are satisfied. The thermal transferring time is set to be equal to or longer than a time when a thermal deformation is generated on a upper portion and a lower portion of the side 1314*a* of the light guide plate 1314 and equal to or shorter than a time when glass transition is generated at a center portion of the side 1314*a* of the light guide plate 1314 and the transferring is desirably performed for approximately five seconds to 20 seconds.

Figure 7A:
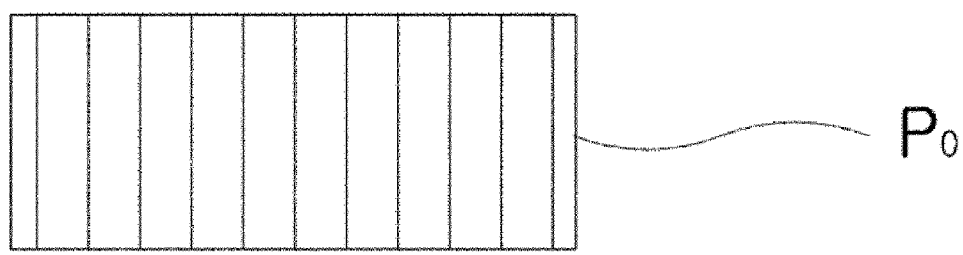
FIGS. 7A to 7F are views illustrating an original pattern of a serration core according to an exemplary embodiment of the present invention.
Figure 7B:
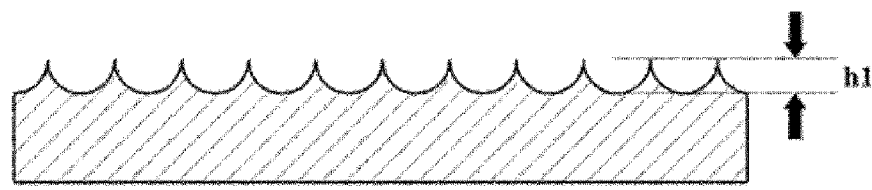
Figure 7C:
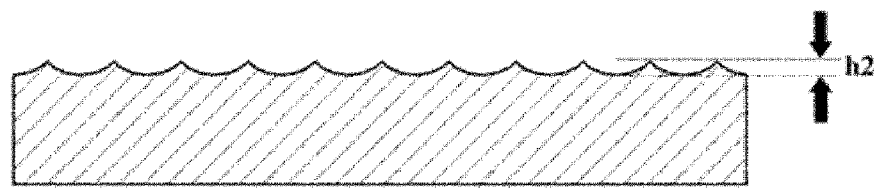
Figure 7D:
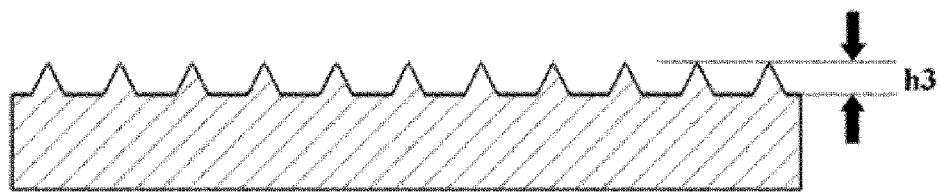
Figure 7E:
Figure 7F:
Figure 8:
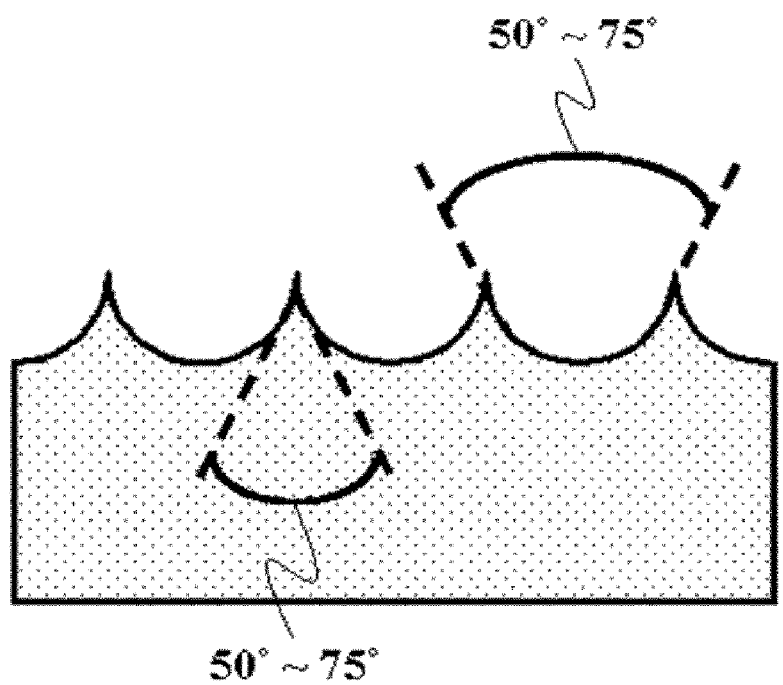
FIG. 8 is a view illustrating various shapes of an original pattern according to an exemplary embodiment of the present invention.

FIGS. 7A to 7F are views illustrating an original pattern Po of a serration core 2200 according to an exemplary embodiment of the present invention and FIG. 8 is a view illustrating various shapes of the original pattern Po according to the exemplary embodiment of the present invention.

As illustrated in FIG. 7A, an original pattern Po which is complementary to the serration pattern P is formed at one side of the serration core 2200 in order to transfer the serration pattern P onto the side 1314*a* of the light guide plate 1314. In the meantime, the original pattern Po is desirably formed such that one or more convex portions are formed to be adjacent to each other to have a saw-toothed shape.

FIGS. 7B, 7C, and 7D illustrate cross-sections of the original pattern Po. The original pattern Po illustrated in FIG. 7B may be provided to have a cross-section in which concave semi-circumferential shapes are arranged to be adjacent to each other. Here, the convex portion between adjacent semi-circumferences of the original pattern Po may have a predetermined height h1. For example, as illustrated in FIG. 8, the convex portions of the original pattern Po is desirably formed at 50° to 75° and an open angle between the adjacent convex portions is desirably 50° to 75°.

The original pattern Po illustrated in FIG. 7C may be provided to have a cross-section in which concave semi-circumferential shapes are arranged to be adjacent to each other. Here, the convex portion between adjacent semi-circumferences of the original pattern Po may have a predetermined height h2. The original pattern Po illustrated in FIG. 7D may be provided to have a cross-section in which triangular shapes are arranged to be adjacent to each other.

Here, the triangular convex portion may have a predetermined height h3. Besides, the original pattern Po may have various cross-section shapes as illustrated in FIGS. 7E and 7F.

The serration pattern P which is transferred onto the side 1314*a* of the light guide plate 1314 may efficiently transmit the light, which is irradiated onto the light entrance surface 1314*a* of the light guide plate 1314, onto the entire surface of the light guide plate 1314 by the original pattern Po and refract and transmit the light onto the upper portion, the lower portion, and the border of the light guide plate 1314 which the light irradiated from the light source 1320 does not reach so that no dark portion is formed in the light outputting distribution of the light guide plate 1314. That is, the pattern of the light entrance surface 1314*a* of the light guide plate 1314 diffuses the incident light so that light reaches a portion which the light does not reach when there is no pattern, and reduces the light from a portion in which the light is concentrated when there is no pattern. In other words, the light which is irradiated from the side 1314*a* of the light guide plate 1314 is efficiently transmitted onto the entire light guide plate 1314 so that a dark portion which the light source does not reach is prevented from being formed in the light guide plate 1314.

The serration pattern P may be formed in the upper/lower portions and the center portion of the side 1314*a* of the light guide plate 1314 so as to have different depths. That is, the serration patterns P may have different concave depths at the upper/lower portions and the center portion of the side 1314*a*.

Figure 9:
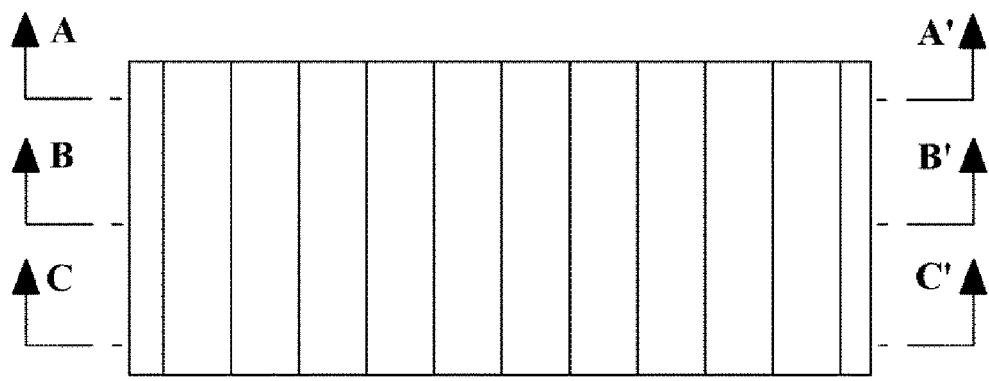
FIG. 9 is a view illustrating a side of a light guide plate according to an exemplary embodiment of the present invention.
Figure 10A:
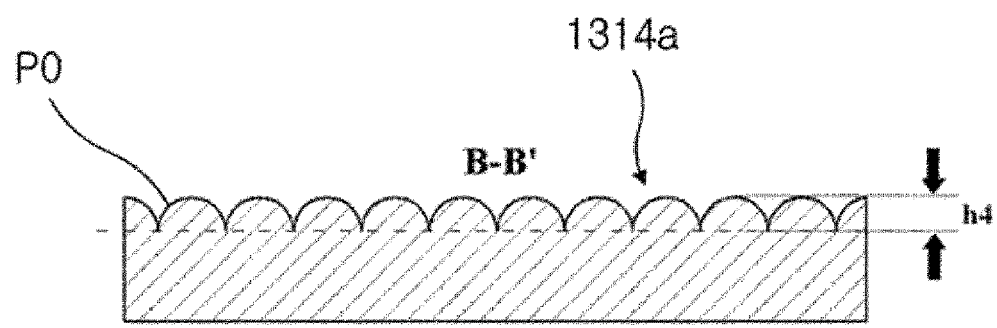
FIGS. 10A and 10B are views illustrating a serration pattern which is formed at upper/lower portions and a center portion of the side of the light guide plate according to the exemplary embodiment of the present invention.
Figure 10B:
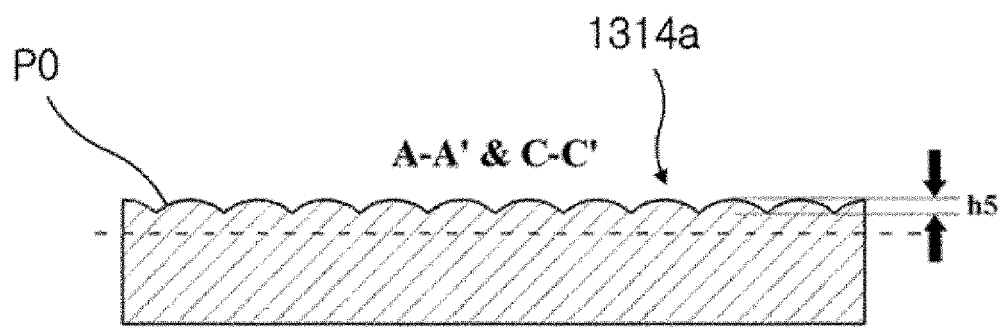

FIG. 9 is a view illustrating a side 1314*a* of a light guide plate 1314 according to an exemplary embodiment of the present invention and FIG. 10 is a view illustrating a serration pattern P which is formed in the upper/lower portions and a center portion of the side 1314*a* of the light guide plate 1314 according to the exemplary embodiment of the present invention.

The above-described original pattern Po has a plurality of convex portions. When the side 1314*a* of the light guide plate 1314 is pressurized and heated to transfer the serration pattern P using the original pattern Po, a concave portion corresponding to the convex portion is formed in the side 1314*a* of the light guide plate 1314. In this case, the upper/lower portions of the light guide plate 1314 are exposed to an external atmosphere but the center portion is enclosed by the upper/lower portions of the side 1314*a* so as not to be exposed to the outside so that a temperature of the center portion is higher than a temperature of the upper/lower portions. Accordingly, the center portion is transferred at a higher temperature so that the concave portion is formed to be deep but the upper/lower portions are transferred at a lower temperature so that the concave portions are formed to be shallow. Therefore, the serration pattern P may be formed to have a wave shape in which the upper/lower portions are shallow and the center portion is deep as seen from the side.

Generally, the light source 1320 is disposed at a center portion of the side 1314*a* of the light guide plate 1314 so that more light may be incident onto the center portion as compared with the upper portion and the lower portion of the light guide plate 1314. In this case, the serration pattern P having different depths of the upper/lower portions and the center portion diffuses the light sources in the upper and lower portions and reduces the light at the center portion so that the light is uniformly transmitted to the entire light guide plate 1314.

For example, referring to FIGS. 9 and 10, in the serration pattern P which is transferred by the original pattern Po which includes the convex portion having the concave semi-circumferential shape of FIG. 7B, a rising depth h4 of the center portion B-B' may be smaller than a rising depth h5 of the upper/lower portions A-A' and C-C'. Heat conduction to the outside (atmosphere or a base plate 2100) or a fixing plate 2300 is performed in the upper/lower portions A-A' and C-C' so that the transferring rate of the original pattern Po is lower than that of the center portion B-B' so that a depth of the concave portion is small. This may be similarly applied to another serration pattern P illustrated in FIG. 6.

Figure 11:
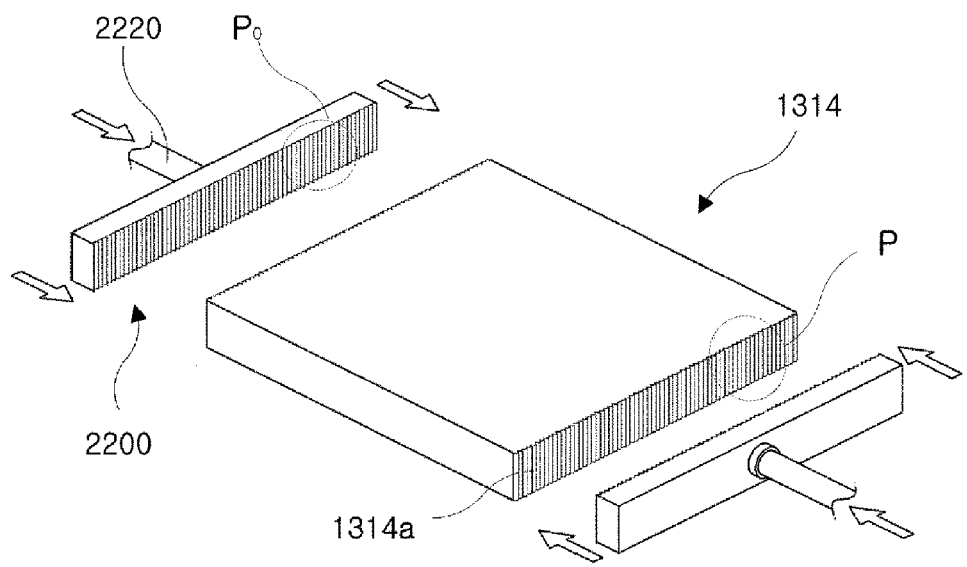
FIG. 11 is a view illustrating a method of transferring a serration pattern onto one light guide plate according to an exemplary embodiment of the present invention.
Figure 12:
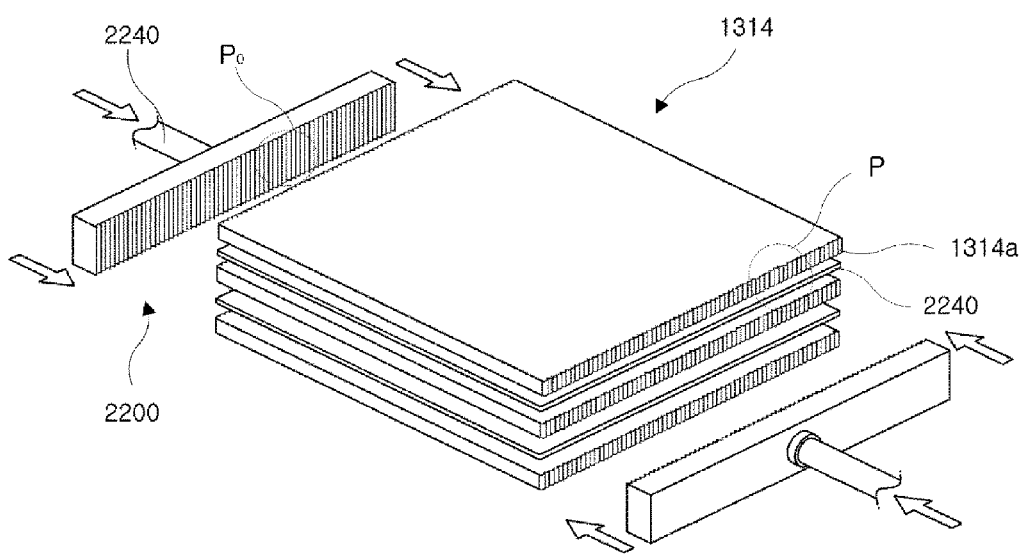
FIG. 12 is a view illustrating a method of transferring a serration pattern onto a plurality of light guide plates according to an exemplary embodiment of the present invention.

FIG. 11 is a view illustrating a method of transferring a serration pattern P onto one light guide plate 1314 according to an exemplary embodiment of the present invention and FIG. 12 is a view illustrating a method of transferring the serration pattern P onto a plurality of light guide plates 1314 according to an exemplary embodiment of the present invention.

Referring to FIG. 11, in order to form a serration pattern P on one light guide plate 1314, one or more serration cores 2200 are provided and an original pattern Po is formed at one side of the serration core 2200. The serration core 2200 includes a serration core supporting unit 2240 and the serration core supporting unit 2240 is coupled to a pressurizing device such as a motor (not illustrated) or a cylinder (not illustrated) to move the serration core 2200 to pressurize the side 1314a of the light guide plate 1314. Therefore, the original pattern Po transfers the serration pattern P onto the side 1314a of the light guide plate 1314. Here, the serration pattern P is formed on one light guide plate 1314, a thickness of the serration core 2200 desirably corresponds to a thickness of the light guide plate 1314.

Referring to FIG. 12, in order to form the serration pattern P on a plurality of light guide plates 1314, the plurality of light guide plates 1314 is laminated in a vertical direction. In this case, a thermal insulating member is interposed between the light guide plates 1314. The thermal insulating member 2240 prevents the heat which is generated while transferring the pattern between the laminated light guide plates 1314 from being conducted to the adjacent light guide plate 1314. That is, the thermal insulating member 2440 which is attached in the upper/lower portions of the light guide plate 1314 may prevent the thermal transition to the adjacent light guide plate 1314.

Figure 13:
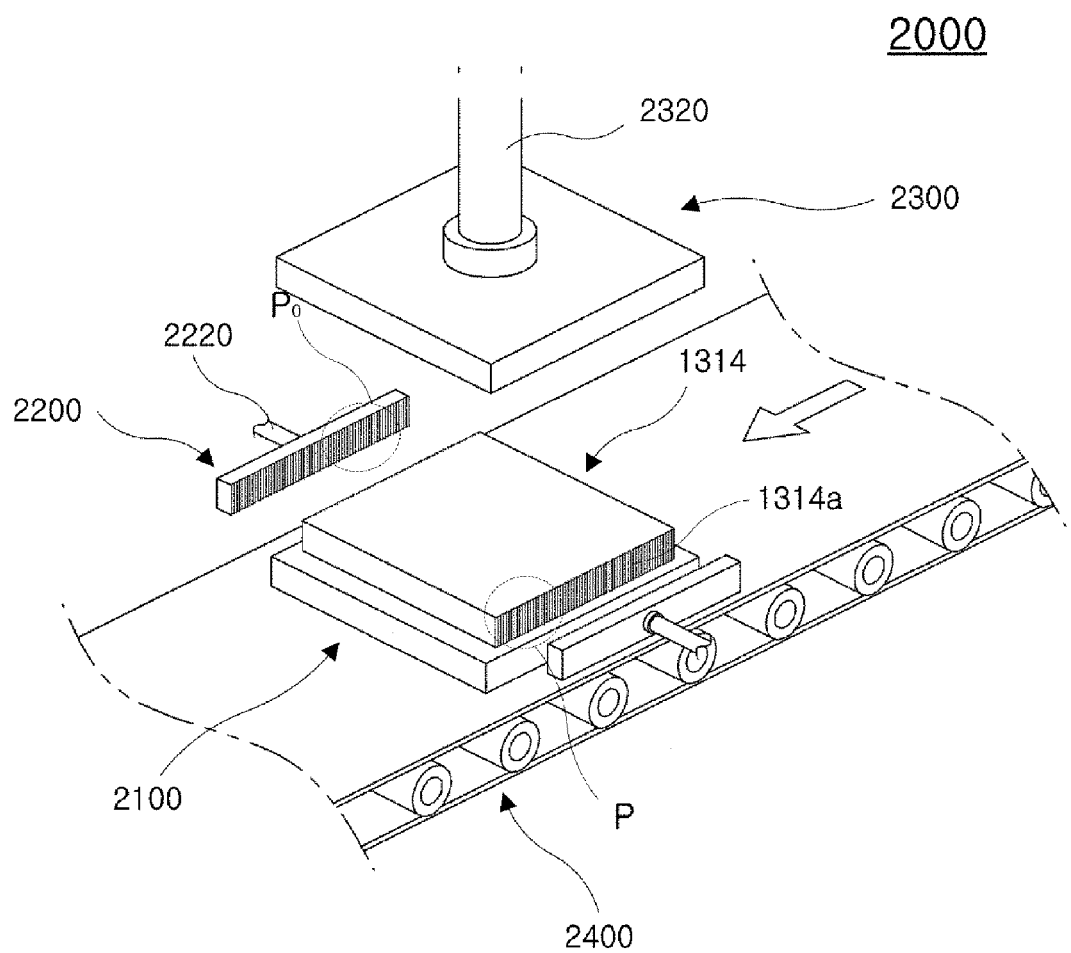
FIG. 13 is a view illustrating a first status of a serration pattern forming apparatus according to an exemplary embodiment of the present invention.
Figure 14:
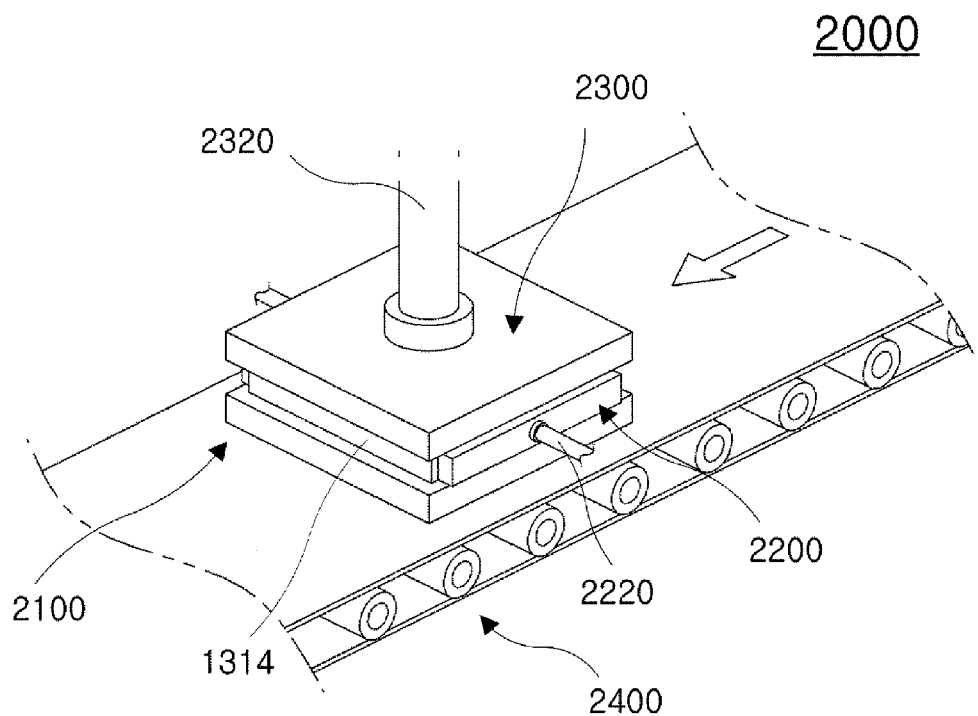
FIG. 14 is a view illustrating a second status of the serration pattern forming apparatus according to the exemplary embodiment of the present invention.

FIG. 13 is a view illustrating a first status of a serration pattern forming apparatus 2000 according to an exemplary embodiment of the present invention and FIG. 14 is a view illustrating a second status of the serration pattern forming apparatus 2000 according to the exemplary embodiment of the present invention.

Referring to FIGS. 13 and 14, the serration pattern forming apparatus 2000 may include a base plate 2100 on which the light guide plate 1314 is mounted, the serration core 2200 which transfers a pattern onto the light guide plate 1314, a fixing plate 2300 which fixes the light guide plate 1314 when the pattern is transferred, and a conveying unit 2400 which conveys the base plate 2100.

The base plate 2100 and the fixing plate 2300 are desirably formed of a metal material. However, if the material may easily transfer the heat and prevent the light guide plate 1314 from being bent by a predetermined pressure at which the serration pattern P is transferred, any material may be used.

The conveying unit 2400 may convey the base plate 2100 on which the light guide plate 1314 is mounted in a position where the original pattern is transferred thereon by the serration core 2200. The conveying unit 2400 may be formed of a conveyer belt.

First, when the light guide plate 1314 is mounted on the base plate 2100, the conveying unit 2400 conveys the base plate by the conveyer belt to a position where the serration pattern P is transferred and the fixing plate 2300 is lowered from the upper portion of the light guide plate 1314 so that the light guide plate 1314 is closely attached onto the base plate 2100. The fixing plate 2300 may include a fixing plate supporting unit 2320 which lowers and supports the fixing plate 2300. The fixing plate supporting unit 2320 is coupled to a moving device such as a motor (not illustrated) or a cylinder (not illustrated) to closely attach the light guide plate 1314 which is mounted on the upper portion of the base plate 2100. Next, one or more serration cores 2200 on which the original pattern Po is formed move to the side 1314a of the light guide plate 1314 and the serration pattern P is transferred onto the side 1314a of the light guide plate 1314 by the original pattern Po of the moved serration core 2200. In this case, the fixing plate 2300 desirably has the same size as the light guide plate 1314 and the fixing plate 2300 may prevent the light guide plate 1314 from being deformed by the heat or a physical force when the serration pattern P is transferred onto the side 1314a of the light guide plate 1314.

In the meantime, even when the serration core 2200 has an original pattern Po having a uniform pattern depth in a vertical direction, as described above, a pattern in which depths of the upper/lower portion are small and a depth of the center portion is large may be formed in the side 1314a but the original pattern Po of the serration core 2200 may be deformed in order to enhance the effect.

Figure 15A:
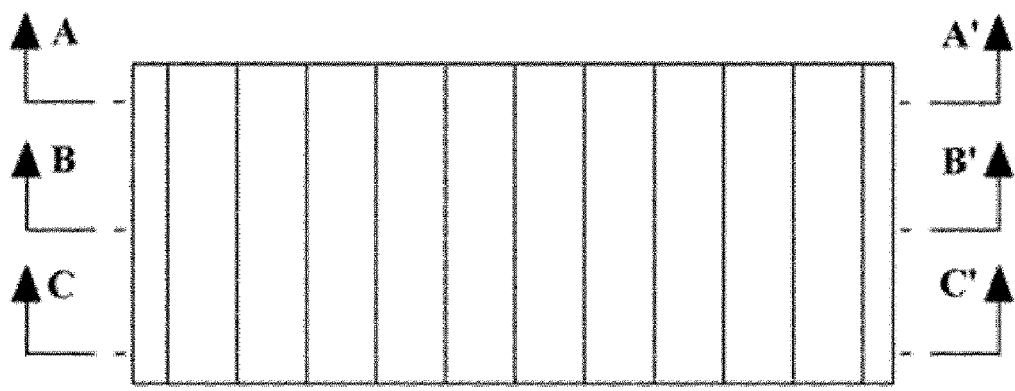
FIGS. 15A to 15C are views illustrating a modification embodiment of a serration core according to an exemplary embodiment of the present invention.
Figure 15B:
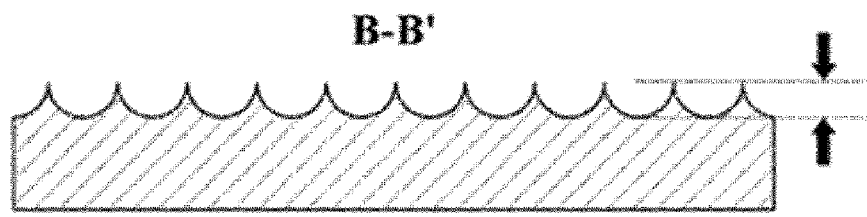
Figure 15C:
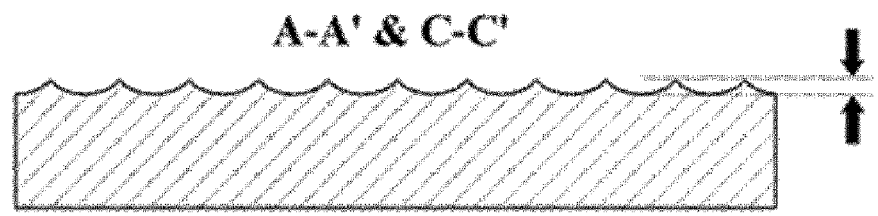

FIG. 15 is a view illustrating a modification embodiment of a serration core 2200 according to an exemplary embodiment of the present invention.

Referring to FIG. 15, an original pattern Po of a serration core 2200 has different depths of the pattern in the upper/lower portions and the center portion. For example, a height h5 of a convex portion in the center portion B-B' of the original pattern Po may be larger than heights h6 of convex portions in the upper/lower portions. When using this, as compared with a case when the serration core 2200 having the same depth of the original pattern Po in the upper/lower portions and the center portion is used, the serration pattern P which is formed in the side 1314a is easily transferred such that depths of concave portions in the upper/lower portions are small and a depth of a concave portion in the center portion is large.

It has been described above that the serration pattern P is formed in the side 1314a so as to have different depths in the upper/lower portions and the center portion, but the serration pattern P may be formed in the side 1314a so as to have the same depth in the upper/lower portions and the center portion if necessary.

Figure 16A:
FIGS. 16A to 16C are views illustrating another modification embodiment of a serration core according to an exemplary embodiment of the present invention.
Figure 16B:
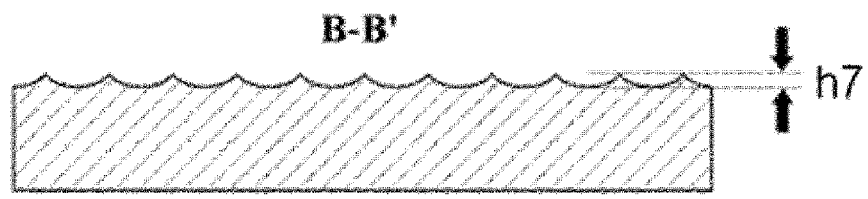
Figure 16C:
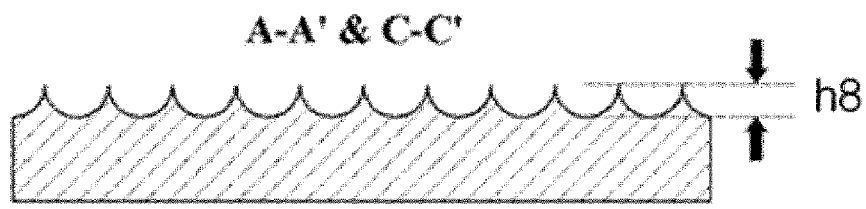

FIG. 16 is a view illustrating another modification embodiment of the serration core 2000 according to an exemplary embodiment of the present invention.

Referring to FIG. 16, an original pattern Po of a serration core 2200 has different depths of the pattern in the upper/lower portions and the center portion. For example, a height h7 of a convex portion in the center portion B-B' of the original pattern Po may be smaller than heights h8 of convex portions in the upper/lower portions. When using this, when the pattern is transferred, the upper/lower portions may more easily conduct the heat to the outside from the light guide plate 1314 than the center portion so that the upper/lower portions have a low pattern transferring rate but have a high convex portion of the original pattern P. Further, the center portion has a higher pattern transferring rate than the upper/lower portions but has a low convex portion of the original pattern P. Therefore, the effects due to the difference in the pattern transferring rate and the difference in the height of the convex portion are offset so that a serration pattern P having the same depth in the vertical direction may be transferred to the light guide plate 1314.

In the meantime, when the depths h8 of the upper/lower portions and the depth h7 of the center portion are adjusted, the serration pattern P may be transferred such that depths are large in the upper/lower portions and a depth is small in the center portion.

Hereinafter, a serration pattern forming apparatus 3000 according to another exemplary embodiment of the present invention will be specifically described.

The serration pattern forming apparatus 3000 may be used to form a pattern on the light entrance surface 1314*a* of the light guide plate 1314 which is used for the display device 1000 described above. However, the serration pattern forming apparatus 3000 is not necessarily used only to form a pattern on the light guide plate 1314 of the present invention but may be used to form a pattern on a side of a similar flat panel plate or a flat panel sheet. However, hereinafter, for the convenience of description, it is described that the serration pattern forming apparatus 3000 forms a pattern on the light guide plate 1314.

Figure 17:
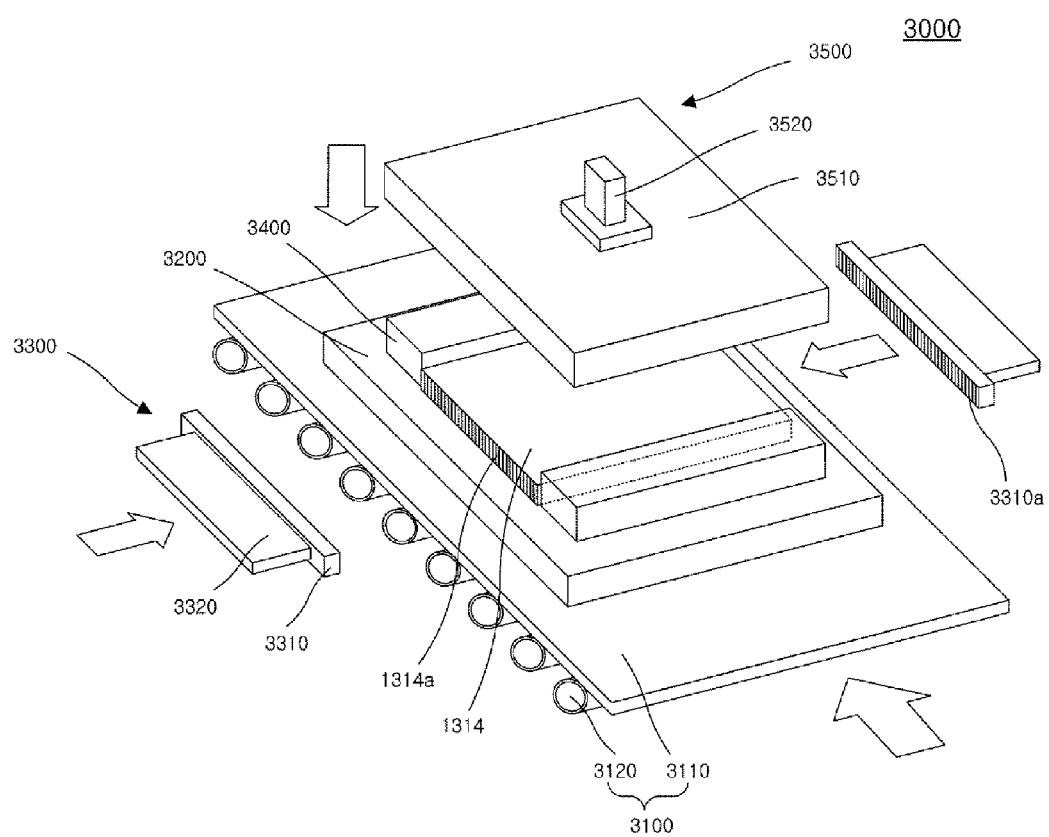
FIG. 17 is a perspective view of a serration pattern forming apparatus according to another exemplary embodiment of the present invention.
Figure 18:
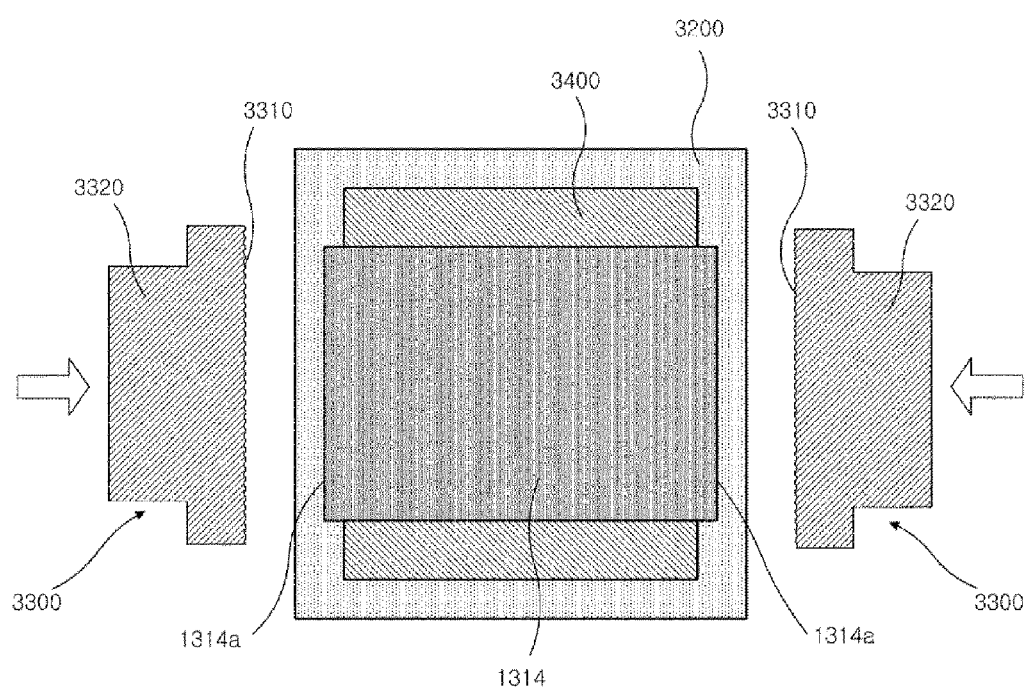
FIG. 18 is a top view of a serration pattern forming apparatus according to another exemplary embodiment of the present invention.

FIG. 17 is a perspective view of a serration pattern forming apparatus 3000 according to another exemplary embodiment of the present invention and FIG. 18 is a top view of the serration pattern forming apparatus 3000 according to another exemplary embodiment of the present invention.

Referring to FIGS. 17 and 18, the serration pattern forming apparatus 3000 may include a conveying unit 3100, a base plate 3200, a pattern transferring unit 3300, a guide member 3400, and a fixing member 3500. Here, the conveying unit 3100, the base plate 3200, the pattern transferring unit 3300, and the fixing member 3500 may correspond to the conveying device 2400, the base plate 2100, the serration core 2200, and the fixing plate 2300 of the serration pattern forming apparatus 2000 according to the exemplary embodiment of the present invention, respectively. In other words, the conveying unit 3100, the base plate 3200, the pattern transferring unit 3300, and the fixing member 3500 may be provided to be same as or similar to the conveying device 2400, the base plate 2100, the serration core 2200, and the fixing plate 2300.

The conveying unit 3100 conveys the light guide plate 1314. The light guide plate 1314 may be transferred while being seated in the base plate 3200. For example, the conveying unit 3100 may be configured by a conveyer belt 3110 on which the base plate 3200 is disposed and a roller 3120 which generates a driving force to move the conveyer belt 3110. The conveying unit 3100 receives the light guide plate 1314 from the outside and conveys the conveyed light guide plate 1314 to an exact position for pattern transferring, that is, a position where a light entrance surface 1314*a* of the light guide plate 1314 is aligned with a pattern surface 3310*a* of the pattern transferring unit 3300. Further, when the pattern transferring is completed, the conveying unit 3100 takes the light guide plate 1314 from the exact position to the outside.

The base plate 3200 may support the light guide plate 1314. The light guide plate 1314 may be conveyed by the conveying device while being seated onto the base plate 3200 or a pattern may be transferred onto the light guide plate 1314 from the pattern transferring unit 3300. The base plate 3200 may be formed of an elastic metal material. The base plate 3200 may be provided as a plate shape having an area which is larger than that of the light guide plate 1314. Therefore, the light guide plate 1314 may be disposed on the base plate 3200.

The pattern transferring unit 3300 transfers a pattern onto the light entrance surface 1314*a* of the light guide plate 1314. The pattern transferring unit 3300 may include a pattern transferring member 3310 and a first piston 3320. The pattern transferring member 3310 has a pattern surface 3310*a* on which an original pattern of a pattern to be transferred onto the light entrance surface 1314*a* is formed. The pattern to be transferred is complementary to the original pattern. The pattern surface 3310*a* is disposed so as to be opposite to the light entrance surface 1314*a* of the light guide plate 1314 which is disposed in the exact position. The first piston 3320 may move forward or backward the pattern transferring member 3310 toward the light entrance surface 1314*a* of the light guide plate 1314. Therefore, the pattern surface 3310*a* is in contact with the light entrance surface 1314*a* to transfer the pattern.

Here, a pattern may be formed on the pattern surface 3310*a* according to the various examples of the original pattern Po according to the exemplary embodiment of the present invention. The heating and pressurizing method, the heat condition, the pressure condition, and the time condition thereof have been described above.

The guide member 3400 and the fixing member 3500 fix the light guide plate 1314 while the pattern transferring unit 3300 transfers the pattern and maintain the thickness of the light guide plate 1314 to be constant.

The guide member 3400 may be provided as a guide block 3410. The guide block 3410 may be formed on the base plate 3200. In this case, the guide block 3410 may be provided so as to meet both sides which are perpendicular to a surface which serves as the light entrance surface 1314*a* among the sides of the light guide plate 1314. Further, the fixing member 3500 may include a fixing plate 3510 which is provided so as to be opposite to the light guide plate 1314 above the light guide plate 1314 which is disposed in the exact position and a third piston 3520 which moves the fixing plate 3510 in the vertical direction. The fixing plate 3510 may be provided as a flat panel having an area which covers a total area of the light guide plate 1314 and the guide member 3400.

Figure 19:
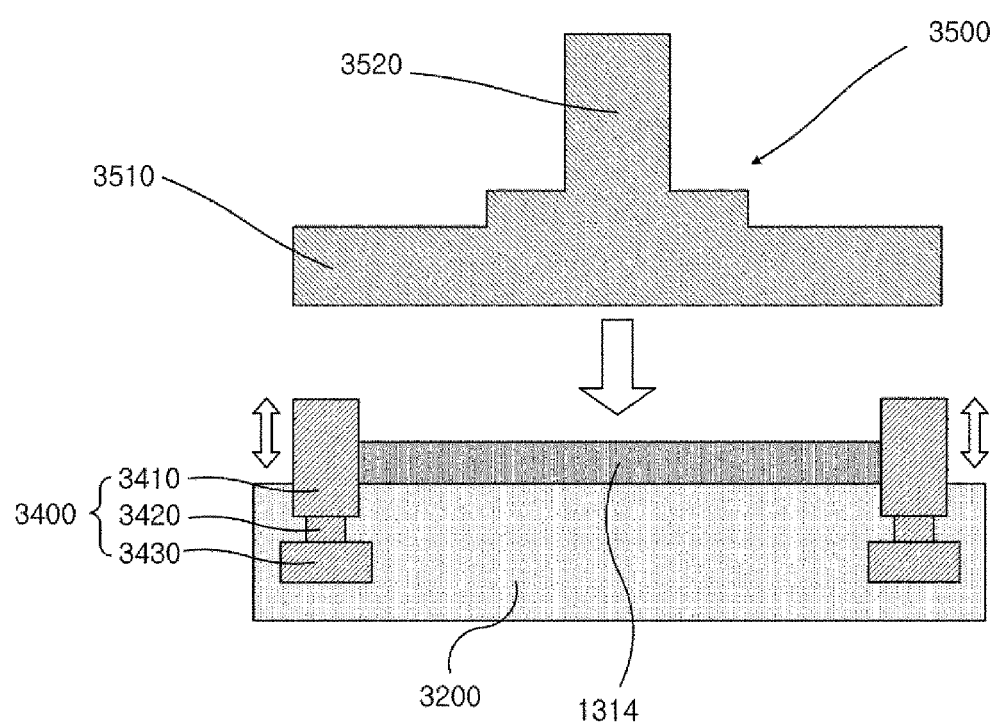
FIG. 19 is a cross-sectional view of a serration pattern forming apparatus according to another exemplary embodiment of the present invention.

Hereinafter, the guide member 3400 and the fixing member 3500 according to another exemplary embodiment of the present invention will be specifically described. FIG. 19 is a cross-sectional view of a serration pattern forming apparatus 3000 according to another exemplary embodiment of the present invention.

Referring to FIG. 19, a guide member 3400 may include a guide block 3410, a second piston 3420, and a driving unit 3430. The guide block 3410 may be disposed so as to be in contact with both sides which are perpendicular to a light entrance surface 1314*a* of the light guide plate 1314 which is disposed on a base plate 3200. Accordingly, the guide member 3400 may fix the light guide plate 1314. A lower portion of the guide block 3410 is connected to the second piston 3420. The driving unit 3430 may lift and lower the second piston 3420 in a vertical direction and thus the guide block 3410 may be vertically lifted and lowered. The driving unit 3430 may lift and lower the guide block 3410 such that a height of the guide block 3410 is higher than the height of the light guide plate 1314 by a predetermined length during the pattern transferring.

The fixing member 3500 may include a fixing plate 3510 which covers the guide block 3410 and the upper portion of the light guide plate 1314 and a third piston 3520 which vertically lifts and lower the fixing plate 3510. The third piston 320 lowers the fixing plate 3510 during the pattern transferring to pressurize the fixing plate 3510 to be in contact with the guide block 3410. Accordingly, the fixing plate 3510 may maintain an interval having a predetermined length from the light guide plate 1314.

When the pattern transferring unit 3300 forms a pattern on the light entrance surface 1314*a* of the light guide plate 1314, the light guide plate 1314 may be deformed by heat or a pressure so that the thickness of the light guide plate 1314 may be irregularly deformed as a whole due to the deformation. When the thickness of the light guide plate 1314 is irregular, light outputting distribution on a light outputting surface 1314*b* of the light guide plate 1314 is irregular so that the image quality of the liquid crystal display device 1000 may deteriorate.

The fixing member 3500 maintains an interval of a predetermined length from a top surface of the light guide plate 1314 while the pattern is transferred onto the light entrance surface 1314*a* of the light guide plate 1314 by the pattern transferring unit 3300, so that the entire thickness of the light guide plate 1314 is uniformly maintained.

When the fixing member 3500 is in direct contact with the top surface of the light guide plate 1314 to press the light guide plate 1314 without using the guide member 3400, the light guide plate 1314 is deformed by the heat or the pressure. But in this case, a space for accepting the deformation is insufficient so that the entire thickness of the light guide plate 1314 is irregular. Generally, a pressure of the center portion of the fixing plate 3510 is strong and a pressure of the border is weak so that a thickness of the center portion of the light guide plate 1314 may be small and a thickness of the border of the light guide plate 1314 may be large.

In contrast, when the fixing member 3500 presses the upper portion of the light guide plate 1314 while having a predetermined interval formed by the guide member 3400, the light guide plate 1314 which is floated from the light guide plate 1314 by the guide block 3410 by a predetermined length may be deformed. Accordingly, when the interval is appropriately adjusted, an amount of the deformed light guide plate 1314 by the heat or the pressure is uniformly generated on the entire light guide plate 1314 so that the entire thickness of the light guide plate 1314 may be uniformly maintained.

Figure 20:
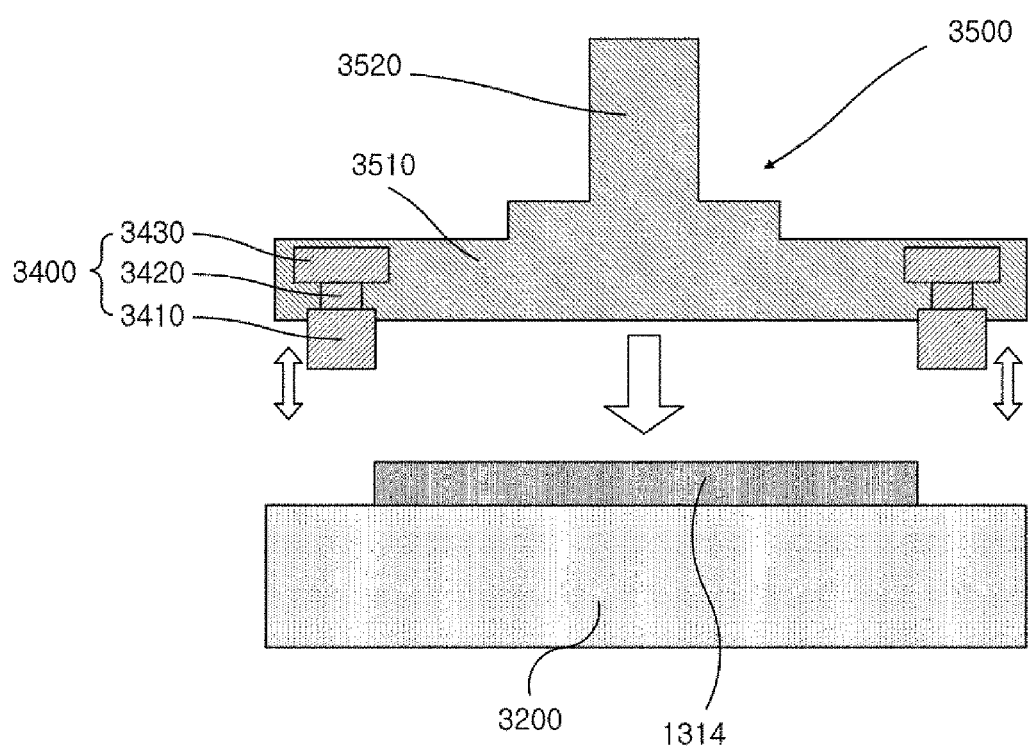
FIG. 20 is a cross-sectional view of a serration pattern forming apparatus according to a modification embodiment of another exemplary embodiment of the present invention.

In the meantime, the guide member 3400 is not necessarily provided on the base plate 3200 as illustrated in FIG. 20. FIG. 20 is a cross-sectional view of a serration pattern forming apparatus 3000 according to a modification embodiment of another exemplary embodiment of the present invention. Referring to FIG. 20, the guide member 3400 may be provided on the fixing member 3500, instead of the base plate 3200.

Figure 21:
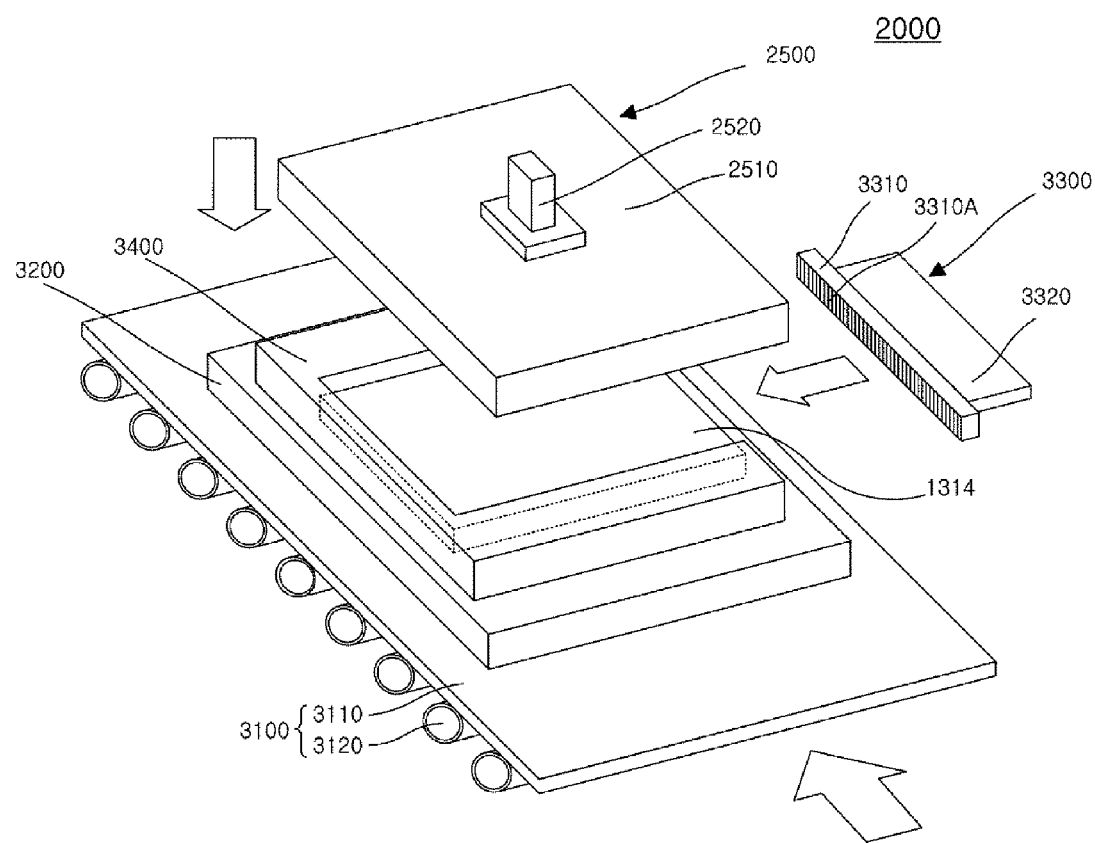
FIG. 21 is a perspective view of a serration pattern forming apparatus according to another modification embodiment of another exemplary embodiment of the present invention.

In the edge-lit back light unit, if necessary, one or two or more sides among four sides of the light guide plate 1314 may be used as the light entrance surface 1314*a*. The serration pattern forming apparatus 3000 of FIGS. 5 and 6 has two pattern transferring units 3300 in order to form a pattern on both light entrance surfaces 1314*a* when two of sides of the light guide plate 1314 are light entrance surfaces 1314*a*, but when only one side of the light guide plate 1314 is used as the light entrance surface 1314*a*, only one pattern transferring unit 3300 may be provided. FIG. 21 is a perspective view of a serration pattern forming apparatus 3000 according to a modification embodiment of another exemplary embodiment of the present invention. Referring to FIG. 21, the light guide plate 1314 has one light entrance surface 1314*a* and the serration pattern forming apparatus 3000 includes one pattern transferring unit 3300 and the guide plate may be disposed to enclose not only a surface which is perpendicular to the light entrance surface 1314*a* but also an opposite surface of the light entrance surface 1314*a*.

Hereinafter, a pattern forming method according to another exemplary embodiment of the present invention will be described. The pattern forming method may be performed using the above-described serration pattern forming apparatus 3000 or a similar device thereto. However, the pattern forming method is not limited to the above-described serration pattern forming apparatus 3000.

Figure 22:
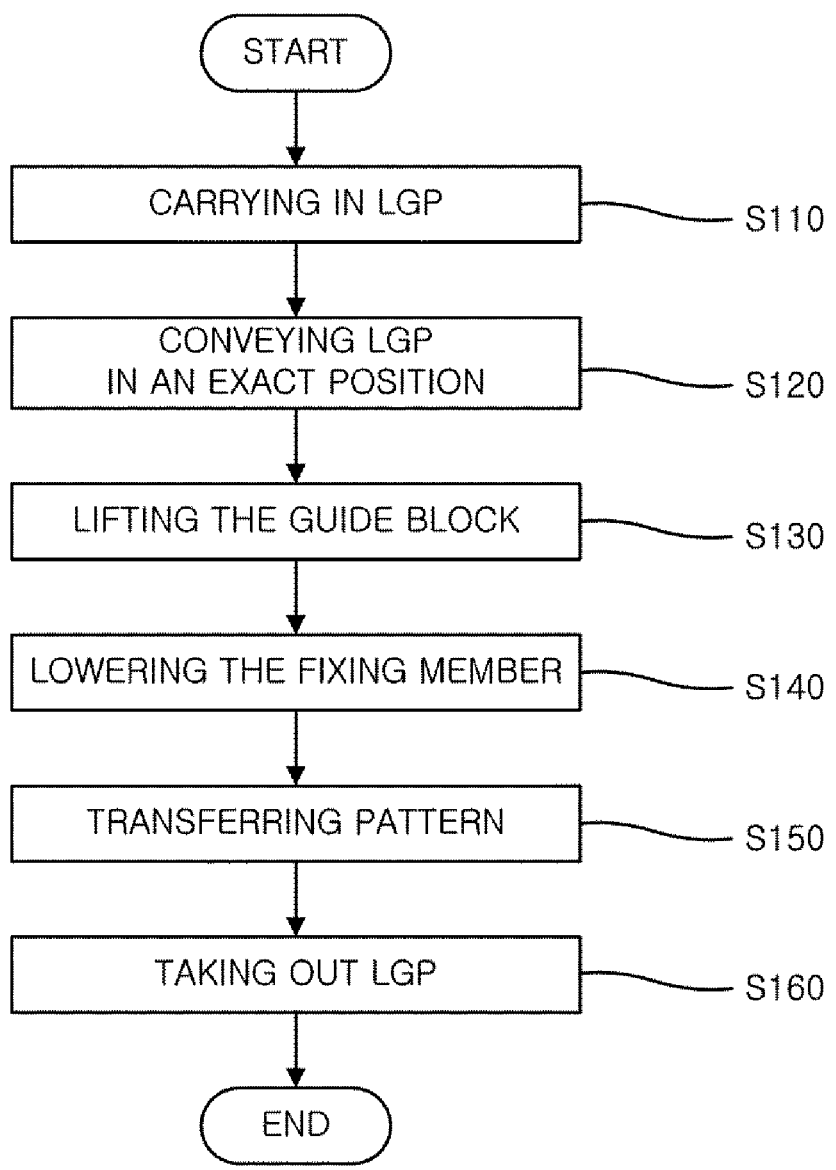
FIG. 22 is a flowchart of a serration pattern forming method according to still another exemplary embodiment of the present invention.

FIG. 22 is a flowchart of a pattern forming method according to still another exemplary embodiment of the present invention.

Referring to FIG. 22, the pattern forming method according to still another exemplary embodiment of the present invention may include receiving the light guide plate 1314 in step S110, conveying the light guide plate 1314 in an exact position in step S120, lifting the guide block 3410 which is higher than the light guide plate by a predetermined length in step S130, pressurizing the guide block 3410 while being in contact with the fixing member 3500 in step S140, transferring a pattern onto the light entrance surface 1314*a* in step S150, and taking out the light guide plate 1314 in step S160. Hereinafter, each step will be specifically described. However, all the above-described steps are not required in the pattern forming method according to still another exemplary embodiment of the present invention so that the pattern forming method may be performed while omitting some steps. Further, the order of the steps does not necessarily match the above-described order and one step and other step may be simultaneously performed or a step which has been described later may be performed earlier than a step which has been described earlier.

First, the light guide plate 1314 is carried in the conveying unit 3100 in step S110. The light guide plate 1314 may be carried onto the conveyer belt together with the base plate 3200 or the base plate 3200 may be provided on the conveyer belt in advance and then the light guide plate 1314 may be carried in on the base plate 3200.

When the light guide plate 1314 is carried in, the conveying unit 3100 conveys the light guide plate 1314 in an exact position in step S120. Here, the exact position means a position where the pattern surface 3310*a* of the pattern transferring unit 3300 moves by the first piston 3320 to be in contact with the light entrance surface 1314*a* of the light guide plate 1314. When the light guide plate 1314 is located in the exact position, the conveying unit 3100 stops.

The guide block 3410 is lifted such that a height of the guide block 3410 is larger than a height of the light guide plate 1314 by a predetermined length in step S130. Here, the predetermined height may vary depending on a size of the light guide plate 1314. Further, the predetermined height may be manually manipulated by an operator or a distance sensor (not illustrated) which detects a height may be attached onto the guide block 3410 or the fixing plate 3510 to control the height to be a height defined by a real time feedback. For example, the serration pattern forming apparatus 3000 may further include a distance sensor (not illustrated) and a control module (not illustrated). The control module may have a memory in which a database for the size of the light guide plate 1314 and a predetermined length for every size is built. The control module may check the size of the light guide plate 1314 which is disposed on the base plate 3200 through a recognizing device (not illustrated) such as a camera and confirm the predetermined height in accordance with the size by referring to the memory. Next, the control module may receive the feedback through the distance sensor to control the driving unit 3430 to uplift the guide block 3410 by a predetermined height from the top surface of the light guide plate 1314.

When the guide block 3410 is lifted to a high position by a predetermined length from the top surface of the light guide plate 1314, the fixing member 3500 is lowered so as to be in contact with the guide block 3410 in step S140. In this case, the third piston 3520 downwardly pressurizes the fixing plate 3510 so as to maintain the contact status of the fixing plate 3510 and the guide block 3410 even when the light guide plate 1314 is deformed later during the subsequent pattern transferring process.

In this status, the pattern may be transferred onto the light entrance surface 1314*a* in step S150. First, the first piston 3320 of the pattern transferring unit 3300 brings the pattern surface 3310*a* of the pattern transferring member 3310 into contact with the light entrance surface 1314*a*, followed by heating or pressurizing to transfer the pattern onto the light entrance surface 1314*a*.

When the pattern transferring is completed, the light guide plate 1314 is taken out in step S160. The fixing plate 3510 is lifted and the conveying unit 3100 moves the light guide plate 1314 to take out the light guide plate 1314.

As described above, the pattern transferring unit 3300 forms a pattern on a side light entrance surface 1314*a* of the light guide plate 1314 using the guide block 3410 and the fixing plate 3510, the thickness of the entire light guide plate 1314 may be controlled to be uniform.

Figure 23:
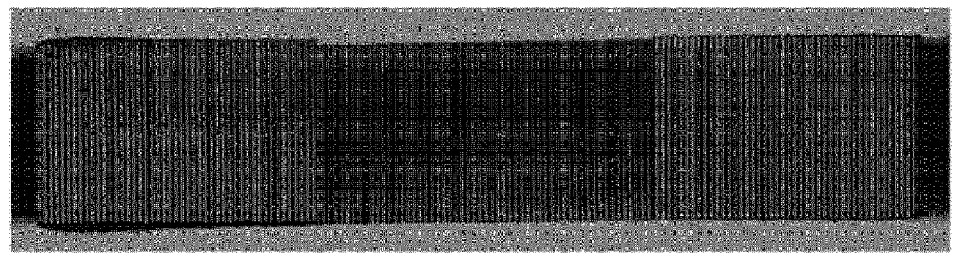
FIG. 23 is a view of a thickness of a light guide plate in which a pattern is formed on a light entrance surface without having a fixing plate according to still another exemplary embodiment of the present invention.
Figure 24:
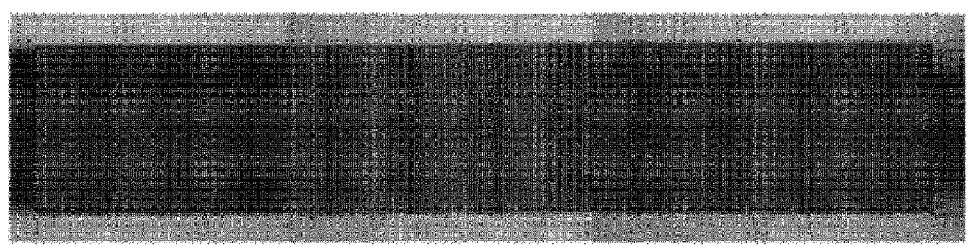
FIG. 24 is a view of a thickness of a light guide plate in which a pattern is formed on a light entrance surface using a fixing plate according to still another exemplary embodiment of the present invention.

FIG. 23 is a view of a thickness of a light guide plate 1314 in which a pattern is formed on a light entrance surface 1314*a* without having the fixing plate 3510 according to still another exemplary embodiment of the present invention, FIG. 24 is a view of a thickness of a light guide plate 1314 in which a pattern is formed on a light entrance surface 1314*a* using a fixing plate 3510 according to still another exemplary embodiment of the present invention, and FIG. 25 is a table of an amount of changed thickness of a light guide plate 1314 per height of a guide block 3410 according to still another exemplary embodiment of the present invention.

Referring to FIG. 23, it is understood that when the pattern is transferred while the fixing plate 3510 is in direct contact with the light guide plate 1314 to pressurize the light guide plate 1314 without having the guide block 3410, a changed amount of the thickness of the side of the light guide plate 1314 is very larger than that of the center portion of the light guide plate 1314.

In contrast, referring to FIG. 24, it is understood that when the pattern is transferred onto the light guide plate 1314 while the fixing plate 3510 is fixed to be spaced apart from the top surface of the light guide plate 1314 with a predetermined interval by the guide block 3410, changed amounts of the thickness of the center portion and the border of the light guide plate 1314 are substantially uniform.

Referring to FIG. 25, when the fixing plate 3510 is disposed in a specific position from the base plate 3200 or the top surface of the light guide plate 1314, a tendency of the changed mount of the thickness of the light guide plate 1314 may be understood. Referring to the Table, it is understood that when the pattern is transferred while the light guide plate 1314 is in contact with the fixing plate 3510, a deviation of the changed mount of thickness of the light guide plate 1314 is very large but when the light guide plate 1314 is spaced apart from the fixing plate, the deviation of the changed amount of thickness is small.

It will be appreciated that technical spirit of the present invention have been described herein for purposes of illustration, and that various modifications, changes, and substitutions may be made by those skilled in the art without departing from the essential characteristics of the present invention. Therefore, the exemplary embodiments of the present invention described above may be separately implemented or combined to each other.

Accordingly, the various exemplary embodiments disclosed herein are not intended to limit the technical spirit of the present invention but describe with the true scope and spirit being indicated by the following claims and the scope of the technical spirit of the present invention is not limited to the exemplary embodiments. The protection scope of the present invention should be interpreted based on the following appended claims and it should be appreciated that all technical spirits included within a range equivalent thereto are included in the protection scope of the present invention.

What is claimed is:

1. An apparatus for forming a serration pattern on a light guide plate having a top surface emitting a light, a bottom surface opposite to the top surface, and at least one side surface, arranged between the top surface and the bottom surface, as an incident surface, the apparatus comprising:
   a base plate supporting the bottom surface of the light guide plate;
   a serration core having an upper surface and a lower surface facing each other, and a pattern surface between the upper surface and the lower surface, the pattern surface being configured to contact the incident surface of the light guide plate and to transfer the serration pattern to the incident surface by a thermal pressing process which causes a thickness deformation of the light guide plate, wherein the pattern surface has an upper portion, a center portion and a lower portion which are placed along the thickness direction of the pattern surface in order, and wherein an original pattern for transferring the serration pattern is formed on the pattern surface and wherein a depth of the original pattern is greater at the center portion than the upper portion and the lower portion, and
   a fixing plate facing the top surface of the light guide plate with a predetermined interval,
   wherein the fixing plate induces a changed thickness of the light guide plate to be uniform by limiting a thickness change amount of the light guide plate to the predetermined interval.

2. The apparatus of claim 1, wherein a depth of the serration pattern is greater at a center portion of the side surface than an upper portion and a lower portion of the side surface.

3. The apparatus of claim 2,
   wherein the base plate and the fixing plate dissipate heat from the top surface and the bottom surface of the light guide plate so that a temperature of a center portion of the at least one side surface of the light guide plate is higher than the upper portion and the lower portion of the at least one side surface of the light guide plate during the thermal pressing process, and
   wherein the higher temperature of the center portion of the light guide plate causes the greater depth of the center portion.

4. The apparatus of claim 1, further comprising:
   a guide block fixing the fixing plate moving down toward the base plate, wherein the guide block is provided on a top surface of the base plate and extended to be higher than the thickness of the light guide plate by the predetermined interval.

5. The apparatus of claim 4, further comprising:
a piston which lifts and lowers the guide block.

6. A method for forming a serration pattern on a light guide plate having a top surface emitting a light, a bottom surface opposite to the top surface and at least one side surface, arranged between the top surface and the bottom surface, as an incident surface, the method comprising:
mounting the light guide plate on a base plate;
transferring the serration pattern onto the incident surface of the light guide plate by a thermal pressing process, which causes a thickness deformation of the light guide plate, using the serration core having an upper surface and a lower surface facing each other, and a pattern surface between the upper surface and the lower surface of the serration core, the pattern surface contacting the incident surface of the light guide plate and transferring the serration pattern to the incident surface of the light guide plate, wherein the pattern surface has an upper portion, a center portion and a lower portion which are placed along the thickness direction of the pattern surface in order, and wherein an original pattern for transferring the serration pattern is formed on the pattern surface and a depth of the original pattern is greater at the center portion than the upper portion and the lower portion; and
fixing a fixing plate to be opposite to the top surface of the light guide plate with a predetermined interval,
wherein the thermal pressing process causes a thickness deformation of the light guide plate inducing a changed thickness of the light guide plate to be uniform by the fixing plate limiting a thickness change amount of the light guide plate to the predetermined interval.

7. The method of claim 6,
wherein an upper portion and a lower portion of the light guide plate are maintained to have a lower temperature than a center portion of the at least one side surface by the base plate and the fixing plate dissipating heat from the top surface and a bottom surface of the light guide plate so that the serration pattern of which the depth is greater at the center portion than the upper portion and lower portion is transferred.

8. The method of claim 6, wherein a guide block which is extended from a top surface of the base plate to be higher than the thickness of the light guide plate by the predetermined interval fixes the fixing plate moving down toward the base plate.

* * * * *